US012010235B2

(12) United States Patent
Kawaguchi

(10) Patent No.: US 12,010,235 B2
(45) Date of Patent: Jun. 11, 2024

(54) APPARATUS AND SYSTEM FOR ZERO-KNOWLEDGE PROOF PERFORMED IN MULTI-PARTY COMPUTATION

(71) Applicant: NOMURA RESEARCH INSTITUTE, LTD., Tokyo (JP)

(72) Inventor: Masashi Kawaguchi, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 219 days.

(21) Appl. No.: 17/466,588

(22) Filed: Sep. 3, 2021

(65) Prior Publication Data

US 2022/0329432 A1 Oct. 13, 2022

(30) Foreign Application Priority Data

Apr. 2, 2021 (JP) .................................. 2021-063738

(51) Int. Cl.
*H04L 29/06* (2006.01)
*H04L 9/32* (2006.01)

(52) U.S. Cl.
CPC .......... *H04L 9/3218* (2013.01); *H04L 9/3247* (2013.01); *H04L 2209/46* (2013.01)

(58) Field of Classification Search
CPC .. H04L 9/3218; H04L 9/3247; H04L 2209/46
See application file for complete search history.

(56) References Cited

U.S. PATENT DOCUMENTS

| 2020/0044862 | A1 | 2/2020 | Yadlin et al. |
| 2020/0186350 | A1 | 6/2020 | Wentz et al. |
| 2020/0328893 | A1* | 10/2020 | Westland ............. H04L 63/123 |
| 2021/0351941 | A1* | 11/2021 | Zamani ................ H04L 9/0861 |

FOREIGN PATENT DOCUMENTS

| WO | 2019/116246 | 6/2019 |
| WO | 2021/041771 A1 | 3/2021 |

OTHER PUBLICATIONS

Partial European Search Report dated Feb. 10, 2022 for corresponding EuropeanPatent Application No. 21195253.6.
ZKProof Community Reference, Version 0.2, Dec. 31, 2019, URL: https://docs.zkproof.org/pages/reference/reference.pdf, total 94 pages; Cited in Specification.

(Continued)

*Primary Examiner* — Evans Desrosiers
(74) *Attorney, Agent, or Firm* — RANKIN, HILL & CLARK LLP

(57) ABSTRACT

An apparatus is one of a plurality of apparatuses that participate in multi-party computation and the apparatus implements a protocol to perform zero-knowledge proof in secret-distribution-based multi-party computation. The apparatus includes an acquisition unit that acquires a share of data related to a matter to be certified, and an output unit that outputs an output share obtained as a result of performing calculation according to the protocol using the acquired share as an input. Verification in zero-knowledge proof can be performed using output shares collected from the plurality of apparatuses participating in the multi-party computation.

4 Claims, 25 Drawing Sheets

(56) References Cited

OTHER PUBLICATIONS

Siim, "A Comprehensive Protocol Suite for Secure Two-Party Computation", Master's Thesis, University of Tartu, Institute of Computer Science Computer Science Curriculum, 2016, URL: https://cyber.ee/research/theses/sander_siim_msc.pdf, total 107 pages; Cited in Specification.
Australian Office Action dated Sep. 6, 2022 issued in Australian Patent Application No. 2021229174.

* cited by examiner

FIG. 4

| | (1) ZERO-KNOWLEDGE PROOF BY USER TERMINAL | (2) PROPOSITION FUNCTION EVIDENCE BY MPC | (3) ZERO-KNOWLEDGE PROOF BY MPC |
|---|---|---|---|
| TRANSFERABILITY | DEPEND ON ZKP SCHEME<br>*Interactive ZK IS NOT TRANSFERABLE, BUT BECOMES TRANSFERABLE WHEN Fiat-Shamir heuristic (transform) IS APPLIED.<br>*zk-SNARKs AND zk-STARKs ARE TRANSFERABLE. | NOT TRANSFERABLE | DEPEND ON ZKP SCHEME<br>*Interactive ZK IS NOT TRANSFERABLE, BUT BECOMES TRANSFERABLE WHEN Fiat-Shamir heuristic (transform) IS APPLIED.<br>*zk-SNARKs AND zk-STARKs ARE TRANSFERABLE. |
| CALCULATION SPEED | HIGH SPEED<br>*DEPEND ON ZKP PERFORMANCE | MEDIUM SPEED<br>*DEPEND ON MPC PERFORMANCE | SUPER LOW SPEED<br>*DEPEND ON PERFORMANCE OF BOTH MPC AND ZKP |
| CERTIFICATION SIZE | MEDIUM<br>*DEPEND ON ZKP PERFORMANCE | SMALL<br>*Bool VALUE | LARGE<br>*DEPEND ON PERFORMANCE OF BOTH MPC AND ZKP |
| VERIFICATION LOGIC TRANSPARENCY | YES | NO | YES |
| PERSON WHO CAN GIVE CERTIFICATION OR EVIDENCE | DATA ENTITY ONLY | DATA ENTITY, MPC PARTICIPATING PARTY<br>*THAT MEANS, IT IS EXECUTABLE WITHOUT DATA ENTITY PERMISSION. FOR EXAMPLE, IT IS EXECUTABLE BASED ON REFERENCE SYSTEM (REFERENCE OF INVESTIGATION RELATED MATTERS, BAR ASSOCIATION REFERENCE). | |

FIG. 8

| VERIFICATION LOGIC ID | VERIFICATION LOGIC FORMULA (RELATION) | ZKP SCHEME |
|---|---|---|
| VL001 | SigVerify(DC004, DC005, DC006) == true # CONFIRM WHETHER IT IS FORMAL TESTING RESULT ISSUED BY HOSPITAL<br>&& elem (DC004, [key1, key2, ...]) # CONFIRM WHETHER HOSPITAL THAT TESTING IS TAKEN IS SPECIFIED ORGANIZATION<br>&& DC005.name == DC001 # CONFIRM WHETHER NAME MATCHES<br>&& DC005.birthdate == DC002 # CONFIRM WHETHER DATE OF BIRTH MATCHES<br>&& DC005.date − current.date <= 10 # CONFIRM WHETHER TESTING RESULT IS ISSUED WITHIN PAST TEN DAYS<br>&& DC005.result == false # CONFIRM WHETHER RESULT OF PCR TESTING WAS NEGATIVE | zk-SNARK(G16) |
| VL002 | ... | Schnorr's Identification Scheme |
| VL003 | DC008[0] + DC008[1] > 10000000<br>&& SigVerify (DC012, DC008[0], DC013[0]) == true<br>&& SigVerify (DC012, DC008[1], DC013[1]) == true | zk-SNARK |

FIG. 9

| DATA ENTITY ID | DATA CLASS ID | DATA (ONLY PUBLIC VALUES ARE REGISTERED) |
|---|---|---|
| DS001 | DC001 | |
| DS001 | DC002 | |
| DS002 | DC001 | |
| DS005 | DC010 | ds005@example.jp |

FIG. 10

| DATA CLASS ID | NAME OF DATA CLASS | DATA FORMAT | DATA FORMAT DETAIL | DISCLOSURE CLASSIFICATION |
|---|---|---|---|---|
| DC001 | NAME (IN KANJI) | String | String | NOT DISCLOSED |
| DC002 | DATE OF BIRTH (YYYYMMDD) | Date | YYYYMMDD | NOT DISCLOSED |
| DC004 | PUBLIC KEY OF HOSPITAL THAT PCR TESTING IS TAKEN (EdDSA /Ed25519) | String | String | DISCLOSED |
| DC005 | PCR TESTING RESULT WITH NAME AND DATE OF BIRTH | Json | { name: "...", birthdate: "...", result: "..." } | NOT DISCLOSED |
| DC006 | SIGNATURE ON PCR TESTING RESULT WITH NAME AND DATE OF BIRTH (EdDSA /Ed25519) | String | | NOT DISCLOSED |
| DC007 | INDIVIDUAL NUMBER | String | 12-DIGIT NUMBER | NOT DISCLOSED |
| DC010 | SIGNATURE ON DATE OF BIRTH (YYYYMMDD) (EdDSA /Ed25519) | String | | NOT DISCLOSED |
| DC011 | PUBLIC KEY OF LOCATION INFORMATION SERVICE (REFERENCE TYPE) | REF_URL | String | DISCLOSED |
| DC012 | PUBLIC KEY OF CITY HALL | String | String | DISCLOSED |

FIG. 11

| VERIFIER ID | NAME OF VERIFIER ORGANIZATION | PRIVILEGE REFERENCE FLAG |
|---|---|---|
| VF001 | SERVICE PROVIDER | True |
| VF002 | TOKYO QUARANTINE STATION | False |
| VF003 | TOKYO DISTRICT PUBLIC PROSECUTORS OFFICE | True |
| VF004 | TOKYO REGIONAL TAXATION BUREAU | False |

FIG. 12

| DATA ENTITY ID | DATA CLASS ID | VERIFICATION LOGIC ID | VERIFIER ID *BLANK = ALL VERIFIERS | VALID PERIOD (MINUTES) *NOT PROTECTED AFTER ELAPSED | PROTECTION RANGE *CERTIFICATION IS REJECTED WHEN IT CAN BE NARROWED WITHIN RANGE. |
|---|---|---|---|---|---|
| DS001 | DC002 | VL001 | VF001 | 525600 | 100000 |
| DS002 | DC008 | VL010 | VF004 | 2630880 | 100000000 |
| DS004 | DC008 | VL010 | VF004 | 525600 | 5000000 |

FIG. 13

| DATA ENTITY ID | DATA CLASS ID | VERIFIER ID | GT AND GTE (GREATER THAN/EQUAL TO OR GREATER THAN) | GT/GTE FINAL CERTIFICATION DATE AND TIME | LT AND LTE (SMALLER THAN/EQUAL TO OR SMALLER THAN) | LT/LTE FINAL CERTIFICATION DATE AND TIME |
|---|---|---|---|---|---|---|
| DS001 | DC002 | VF005 | ≥19741231 | 201810081437 | <19970101 | 202006121503 |
| DS003 | DC008 | VF004 | >1030000 | 201903250215 | (NOT REGISTERED) | (NOT REGISTERED) |

FIG. 17

| VERIFICATION LOGIC ID | VERIFICATION LOGIC FORMULA | ZKP SCHEME | VERIFIER ID |
|---|---|---|---|
| VL001 | SigVerify(DC004, DC005, DC006) == true # CONFIRM WHETHER IT IS FORMAL TESTING RESULT ISSUED BY HOSPITAL<br>&& elem (DC004, [key1, key2, ...]) # CONFIRM WHETHER HOSPITAL THAT TESTING IS TAKEN IS SPECIFIED ORGANIZATION<br>&& DC005.name == DC001 # CONFIRM WHETHER NAME MATCHES<br>&& DC005.birthdate == DC002 # CONFIRM WHETHER DATE OF BIRTH MATCHES<br>&& DC005.date − current.date <= 10 # CONFIRM WHETHER TESTING RESULT IS ISSUED WITHIN PAST TEN DAYS<br>&& DC005.result == false # CONFIRM WHETHER RESULT OF PCR TESTING WAS NEGATIVE | zk-SNARKs(G16) | VF005 |
| VL002 | ... | Schnorr's Identification Scheme | VF009 |
| VL003 | DC008[0] + DC008[1] > 10000000<br>&& SigVerify (DC012, DC008[0], DC013[0] ) == true<br>&& SigVerify (DC012, DC008[1], DC013[1] ) == true | zk-SNARKs(G16) | VF005 |

FIG. 22

| DATA ENTITY ID | DATA CLASS ID | VALUE |
|---|---|---|
| DS001 | DC002 | a592... |
| DS001 | DC004 | 0479... |
| DS003 | DC008 | e3c5... |

FIG. 23

| VERIFICATION LOGIC ID | DATA ENTITY ID CORRESPONDENCE VALUE (WHEN NOTHING IS REGISTERED, COMMON VALUE IS USED FOR ALL DATA ENTITY IDS) | ADDITIONAL INFORMATION (DIFFERS DEPENDING ON ZKP SCHEME SUCH AS CRS, COMMITMENT, ETC.) |
|---|---|---|
| LV001 | (BLANK = NOT REGISTERED) | [ proving_key: "...", verification_key: "..." ] |
| LV010 | [DS003, DS004] | [ proving_key: "...", verification_key: "..." ] |

FIG. 24

| DATA ENTITY ID CORRESPONDENCE VALUE | VERIFICATION LOGIC ID | PROPOSITION FUNCTION OUTPUT SHARE | ZKP OUTPUT SHARE | CALCULATION START DATE AND TIME |
|---|---|---|---|---|
| DS001 | VL001 | 0 | a592... | 20181008143 7 |
| [DS003, DS004] | VL010 | 1 | e3c5... | 20190325021 5 | ered as secret-distribution-based multi-party computation. This calculation method can include functional completeness, and implementation examples of various protocols by two-party computation are described in Sander Siim, A Comprehensive Protocol Suite for Secure Two-Party Computation, 2016, URL: https://cyber.ee/research/theses/sander_siim_msc.pdf.

APPARATUS AND SYSTEM FOR ZERO-KNOWLEDGE PROOF PERFORMED IN MULTI-PARTY COMPUTATION

BACKGROUND

Technical Field

The present invention relates to an apparatus and a system for zero-knowledge proof performed in a multi-party computation.

Related Art

In recent years, a technology related to zero-knowledge proof is known. The zero-knowledge proof (ZKP) is a technology for proving to a person that the person knows the knowledge (secret) or that the knowledge (secret) has a certain property and satisfies a condition without disclosing the knowledge (secret) that the person has to the person. However, the ZKP must have three properties: completeness (the property of being able to always persuade the verifier if the proposition that the certifier tries to certify is true), soundness (a property that if a proposition that the certifier tries to certify is false, the persuasion ends in failure with a high probability), zero-knowledge (a property in which the verifier obtains no knowledge from the result of certifying a proposition by the certifier other than that the proposition is true. That is, it is possible to simulate the validity of the certification even if the verifier does not have knowledge). Standardization of terms related to ZKP and characteristics of each method is promoted, and this document also follows this in principle (see ZKProof Community Reference, Version 0.2, Dec. 31, 2019, URL: https://docs.zkproof.org/pages/reference/reference.pdf).

On the other hand, the multi-party computation (MPC) is an encryption technique that can derive a calculation result while keeping an input value secret. In particular, according to the k-out-of-n threshold secret distribution method (n≥k≥2), a calculation method in which a party in charge of each share performs a predetermined procedure (protocol) and derives a calculation result while an input value corresponding to a secret is secret-distributed to a plurality of shares is referred to as secret-distribution-based multi-party computation. This calculation method can include functional completeness, and implementation examples of various protocols by two-party computation are described in Sander Siim, A Comprehensive Protocol Suite for Secure Two-Party Computation, 2016, URL: https://cyber.ee/research/theses/sander_siim_msc.pdf.

Recently, digitalization of social infrastructure has been demanded, and privacy protection has become an urgent issue, and ZKP and MPC have attracted attention as effective countermeasures.

SUMMARY

There are many cases where an individual or an organization is required to certify an external verifier. Many of modern certification acts are performed by disclosing, to a verifier, a certificate issued by a third party organization or information included in the person (organization).

However, in the process of the certification act, the information given to the verifier often includes unnecessary information in both quantity and quality. For example, a means for certifying that "the person is an adult" when purchasing alcoholic beverages may be fulfilled by notifying a seller of alcoholic beverages as a verifier of a date of birth by presenting a license of the person who is a certifier. In this example, in addition to the fact that "the person is an adult", unnecessary information is included in both the amount (actual age) and the quality (address, etc.).

In other words, there is a demand for a certification means that limits leakage of the privacy information more than necessary (information beyond the conclusion of the proposition requested to be certified) described above and has sufficient persuasiveness to the verifier without impairing convenience.

The above-described problem can be conditionally solved by known zero-knowledge proof. However, a person who calculates proving with zero-knowledge proof is required to handle and calculate privacy information (knowledge of plaintext). Therefore, in a case where the certification is entrusted to another person, it is required to reveal privacy information to the entrustee. As a typical example, in the case of performing the certification based on privacy information of two persons, one of the two persons or a third party is entrusted with the certification, and it is assumed that the privacy information of at least one of the two persons is known to someone other than the person himself/herself. This is a problem when a person who does not want to leak unnecessary privacy information is requested to certify based on the privacy information.

The present invention has been made in view of the above-described problems. An object thereof is to realize a more user-friendly certification service or to realize a technology capable of reducing the risk of privacy information leakage.

One aspect of the present invention relates to an apparatus. The apparatus is one of a plurality of apparatuses that participate in multi-party computation and implements a protocol to perform a proposition function and zero-knowledge proof in secret-distribution-based multi-party computation. The apparatus includes an acquisition unit that acquires a share of data related to a matter to be certified, and an output unit that outputs an output share obtained as a result of performing calculation according to the protocol using the acquired share as an input. Verification in the proposition function or verification in the zero-knowledge proof can be performed using output shares collected from the plurality of apparatuses participating in the multi-party computation.

Another aspect of the invention is a system. The system is a system that performs zero-knowledge proof, and includes a policy storage unit that stores a privacy policy, a history storage unit that stores a verification history, an obtaining unit that obtains a verification request from a verifier, and a determining unit that determines whether or not to reject the verification request based on the content of the acquired verification request, the privacy policy stored in the policy storage unit, and the verification history stored in the history storage unit.

Moreover, an aspect of the present invention also includes any combination of the above-described components as well as those in which the components and expressions of the present invention are replaced among an apparatus, a process, a system, a computer program, a recording medium having a computer program stored, and the like.

According to the present invention, it is possible to realize a certification service with improved user convenience or to reduce the risk of privacy information leakage.

BRIEF DESCRIPTION OF DRAWINGS

FIG. 4 is a table illustrating features of certification modes implemented in the MPC-ZKP system;

FIG. 8 is a data structure diagram illustrating an example of the verification logic formula DB of FIG. 7;

FIG. 9 is a data structure diagram illustrating an example of the data entity DB of FIG. 7;

FIG. 10 is a data structure diagram illustrating an example of the data class DB of FIG. 7;

FIG. 11 is a data structure diagram illustrating an example of the verifier DB in FIG. 7;

FIG. 12 is a data structure diagram illustrating an example of the individual policy DB in FIG. 7;

FIG. 13 is a data structure diagram illustrating an example of the verification history DB of FIG. 7;

FIG. 17 is a data structure diagram illustrating an example of a verification logic formula DB of the verifier terminal;

FIG. 22 is a data structure diagram illustrating an example of an input value DB in the MPC participating party;

FIG. 23 is a data structure diagram illustrating an example of an additional information DB in the MPC participating party;

FIG. 24 is a data structure diagram illustrating an example of a share DB in a share storage unit of the MPC participating party.

DETAILED DESCRIPTION

Figure 1:
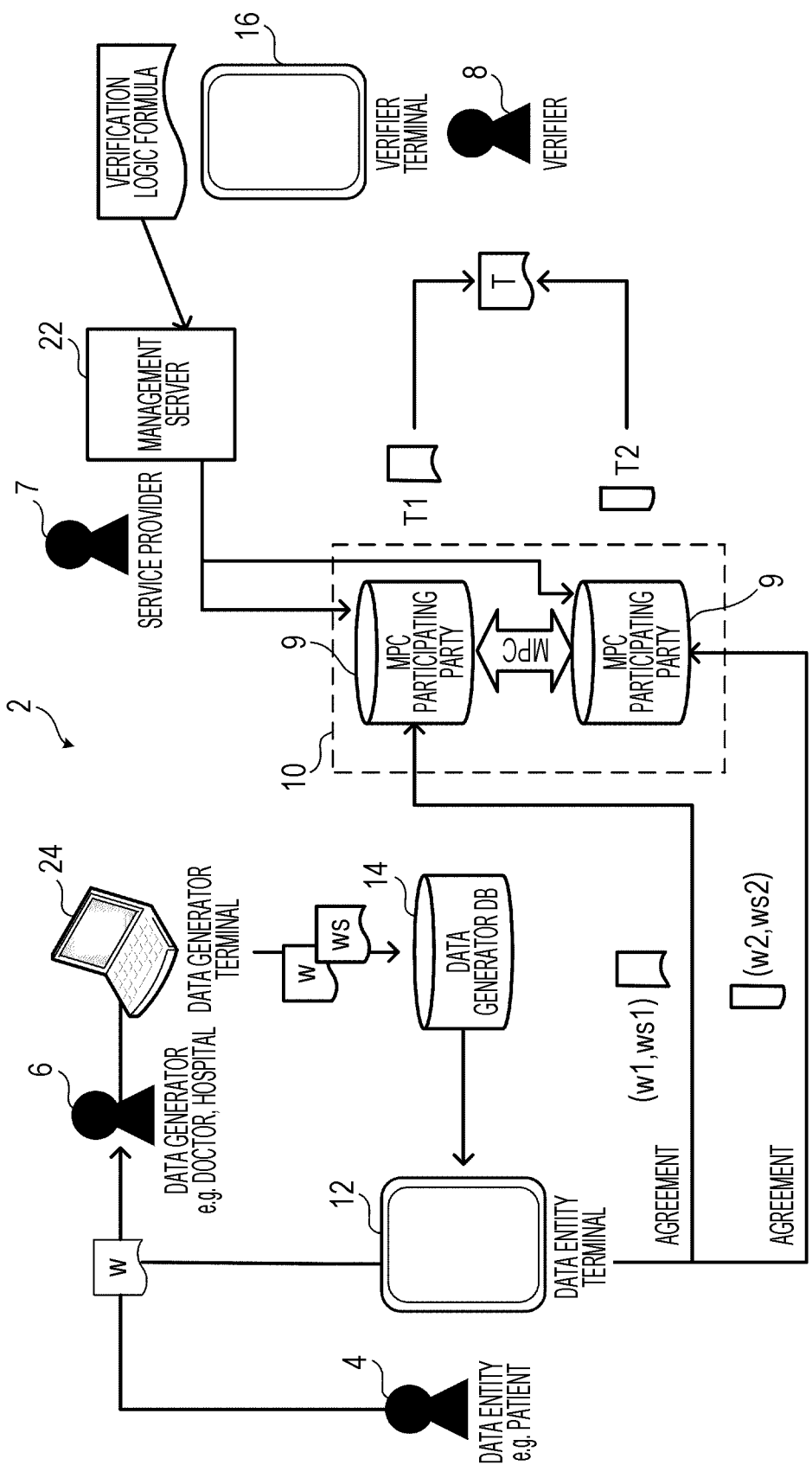
FIG. 1 is a schematic diagram illustrating a configuration of an MPC-ZKP system according to an embodiment.

An embodiment will be described in detail below with reference to the accompanying drawings. Note that the following embodiment does not limit the invention according to the claims, and all combinations of features described in the embodiment are not necessarily essential to the invention. Two or more features of the plurality of features described in the embodiment may be discretionarily combined. In addition, the same or similar configurations are denoted by the same reference numerals, and redundant description will be omitted.

(Embodiment)

An embodiment relates to an MPC-ZKP system that realizes an entrusted attribute certifier with privacy protection by using a combination of secret-distribution-based multi-party computation which is one of secret calculation and ZKP.

In the MPC-ZKP system according to the present embodiment, by using a combination of the MPC and the ZKP, it is possible to eliminate an act of exposing privacy more than necessary regarding data that has left a data entity except for a conclusion on a proposition for which certification is required, consistently from storage of the data, calculation based on the data, result output of the calculation, and verification of the result output. In other words, input privacy can be protected by the MPC and the ZKP, and leakage of output privacy can be limited by the query audit method.

Main features (but not limited thereto) of the MPC-ZKP system according to the present embodiment are as follows.

1. Privacy Protection at Time of Certification

In the MPC-ZKP system according to the present embodiment, it is not necessary to deliver data including privacy in an understandable state to a certification entrustee or a verifier. In the MPC-ZKP system, privacy is protected by the following two mechanisms. Details of each will be described later.

Input privacy protection function (secret calculation, ZKP)

Output privacy protection function (query audit method)

2. Transparency of Verification Logic

In the MPC-ZKP system according to the present embodiment, it is possible to make verification logic unique and to impart transparency while indicating the conclusion of the verification. In addition, data is managed by pairing a digital signature and a message, and the pair is defined as a witness. Then, by including "the completeness of the message can be verified by the signature and the public key" in the verification logic (Relation) of the ZKP, the source of the data (data generator) can be clarified.

3. Standardization of Verification

In the MPC-ZKP system according to the present embodiment, by sharing verification having the same purpose and classifying data (witness and instance) necessary for verification into classes, it is possible to promote once-only or to enable execution of a plurality of verifications regarding the same data (witness and instance). Note that the witness is non-public information used for verification, whereas the instance is public information used for verification.

4. Offline Certification

As will be described later, depending on the ZKP scheme, one certification calculation result can be persuasive for (transferable) not only for the original verifier but also for a plurality of verifiers. Utilizing this property, the certification result is stored only on a portable terminal (deleted from the certification entrustee), and the certification from the owner (user) of the terminal to the verifier face-to-face or over a dedicated line is enabled.

5. Entrustment of Certification, Certification by Substitute

In the MPC-ZKP system according to the present embodiment, even when a person (data entity) who desires to keep data secret does not allow an act of certification for some reason, verification required by a verifier can be performed only by preparing data, sharing the data, and secret-distributing and providing the data to a certification entrustee (provider of the MPC-ZKP system) without knowledge of a proving method (for example, a calculation method of ZKP). An advantage of that certified by can be performed by a substitute is found in a case, for example, where the target person is not present (or death, missing), where authority is temporary lost due to missing of their terminal or the like, where knowledge of information technology is not enough, where an inquiry from an authority is received, or the like. In this manner, privacy can be protected as described above while the certification is entrusted.

6. Strengthening of Persuasiveness of Simple Evidence (Proposition Function)

For a certain proposition, even if the certification entrustee can calculate the proposition function by the MPC and output the verification result (evidence) while protecting the privacy of the data, which can be a reason, the verifier is not necessarily persuaded only by a simple evidence. This is because there is a possibility that the entrustee (a person who has performed a proposition function by the MPC) and an entruster (a data entity or the like) collude with each other to deceive the verifier, that the data entity has submitted false proof to the verifier, or that a wrong verification result is derived due to insufficient ability of the certifier (error in certification calculation, bug). In other words, in the simple certification by a substitute, submission of only the output of the proposition function is not persuasive. For example, providing an execution result of the proposition function by the MPC corresponds to such simple evidence.

The MPC-ZKP system according to the present embodiment provides a function of outputting a proof of ZKP regarding exactly the same proposition as the previously executed proposition function, arbitrarily or randomly by the verifier. In other words, a function capable of performing surprise check of the correctness of the conclusion and the validity of the procedure of the adopted verification logic is provided with respect to the above-described simple evidence. This effect works so that the certification entrustee cannot easily give fraudulent evidence.

With the above-described mechanism, a strong incentive for not falsifying is generated in the certification entrustee. This is because if it is known that it has been falsified, their credibility is significantly impaired. In other words, from the viewpoint of game theory, by incorporating a mechanism that is difficult to falsify into the certification system on purpose, it is possible to give strong persuasiveness to a simple evidence (a result of the proposition function). As a result, the persuasiveness of a simple evidence, that is, an output result of the proposition function by the MPC, can be obtained according to the ZKP while reducing the opportunity to perform calculation of the ZKP with high calculation cost. As an application example, when an output result of MPC of an arbitrary calculation program f(x) based on the secret x is y, since it is possible to certify a proposition that "a result of f(x) is y", a strong incentive not to output an erroneous calculation result of f(x) is given.

7. Resolution of Combinatorial Explosion between Certifiers and Verifiers in Interactive ZK When computing the Interactive ZK, the certifier and verifier must be able to interact (must be online with each other) from the beginning of certification to the completion of the certification. In particular, in a case where the data entity performs certification by own terminal, the combination of "verifier:certifier" has a "many:many" relationship, which causes a so-called combinatorial explosion. In the MPC-ZKP system according to the present embodiment, it is possible to entrust the MPC participating party with the roles of the certifier of the plurality of data entity as protecting privacy, and to unify the roles. As a result, the combination of "verifier:certifier" is converted into a "many: 1" relationship.

8. Certification Using Witnesses of Two or More Data Entities

In the conventional ZKP using a plaintext witness, when it is desired to perform certification based on secrets (witnesses) of a plurality of data entities, one of the following measures needs to be taken.

(1) A witness of each data entity is collected to an environment of a trusted third party and ZKP is calculated in the environment. In this case, privacy protection from the trusted third party environment (TTP, Trusted Third Party) needs to be given up.

(2) Individual data entity calculates certification based only on their own witness. However, in this case, it is difficult to certify based on combined (for example, total) information of pieces of information of two entities, and proofs increase by the number of data entities, and there is a possibility that output privacy of each data entity is leaked.

On the other hand, in the MPC-ZKP system, since the witness of each data entity is privacy-protected (secret distribution) from all but the data entity themselves, the certification can be calculated based on witnesses of a plurality of data entities while protecting the witnesses of all the data entities.

FIG. 1 is a schematic diagram illustrating a configuration of an MPC-ZKP system 2 according to an embodiment. In this example, a situation is assumed in which a patient is examined by a doctor and a notification of the result is provided to a management office at a national border or a prefectural border. The MPC-ZKP system 2 includes a data entity terminal 12 owned by a data entity 4 such as a patient, a data generator database (DB) 14 that stores data generated by a data generator 6 such as a doctor or a hospital and a share thereof, an MPC participating party group 10 including a plurality of MPC participating parties 9 participating in the MPC, a management server 22 that manages management information of a certain MPC participating party group 10, and a verifier terminal 16 owned by a verifier 8 such as a management office of a national border, a prefectural border, or the like. A protocol for performing ZKP in the MPC is implemented in each MPC participating party (also referred to as an MPC participating server) included in the MPC participating party group 10. The components (the data entity terminal 12, the data generator DB 14, each MPC participating party of the MPC participating party group 10, and the verifier terminal 16) of the MPC-ZKP system 2 are communicably connected to one another via a network such as the Internet. Note that, in the present embodiment, a case where the data entity terminal 12 and the data generator DB 14 are configured as separate bodies has been described as an example, but the data generator DB 14 may be included in the data entity terminal 12.

A manner of providing ZKP in the MPC-ZKP system will be described. In general, a ZKP calculation process can be classified into three procedures: setting up, proving, and verifying. In the present embodiment, proving is performed by the MPC. In other words, the witness is secret-distributed by the k-out-of-n threshold secret distribution method ($n \geq k \geq 2$) and is set as a non-public value, and then the proving procedure of taking the witness as an input value is performed by secret-distribution-based multi-party computation (MPC). Note that a prime number q, a generation source g, i ∈ {0, 1, . . . , n–1}, and n based on a security parameter 1 are the number of MPC participating parties, and these are set as public values. In addition, the witness is represented by w, and the share in which w is secret-distributed by the k-out-of-n threshold secret distribution method is represented by {w0, w1, . . . wn–1}. It is assumed that wi is distributed to the MPC participating party Pi. In the k-out-of-n threshold secret distribution method, reconstructing can be performed by a share stored in k or more MPC participating parties among n, and it is set as n≥k≥2. Any ZKP can be realized by the MPC satisfying Functional Completeness.

zk-SNARKs and Groth-Sahai seek Trusted Setup. Trusted Setup is a manner of requesting a reliable party to prepare (setting up) for zero-knowledge proof of a proposition. For example, the participating party conceals a random number and discloses this value as CRS. There is a weak point that falsification may be made (soundness is threatened) in a case where this random number is known to the certifier. Therefore, in Trusted Setup, a plurality of parties participate and cooperate to issue a CRS obtained by adding random numbers of the respective parties by using a property such as homomorphism. With this structure, falsification can be prevented if any one of all the participating parties refuses to provide the random number. In particular, in some implementations such as Ligero and Sonic, which are subclasses of zk-SNARKs, a range of required Trust can be reduced.

In the present invention, since the MPC participating parties are reliable as a role of maintaining secret shares, and a plurality of parties (n≥2) are arranged, all or some of the MPC participating parties can also serve as reliable parties.

As an example, procedures (1. to 3.) of zk-SNARKs are described.

1. Calculating Trusted Setup by MPC Participating Parties.

QAP<-Compile (relation)
CRS<-Setup (QAP)

Note that relation is a verification logic formula applicable to verification logic, QAP is a quadratic arithmetic program (or may be R1CS) applicable to relation (verification logic method), CRS is a common reference string, CRS={pk, vk}, pk is a providing key, and vk is a verification key (hereinafter, CRS may be described as additional information.).

2. Proving by MPC
$\pi_i$<-Prove (CRS, x, wi)
Note that x is an instance.
The MPC participating party Pi provides $\pi_i$ to the verifier.
3. Verifying by Verifier
$\pi$<-Reconstruct ($\pi_0$, $\pi_1$, . . . , $\pi_{n-1}$)
{accept, reject}<-Verify (CRS, x, $\pi$)
Note that "accept" indicates acceptance of certification, and "reject" indicates rejection of certification.

In this example, the data entity 4 is a patient, and may be an owner of the data to be provided or a person who has the privacy rights. The data entity 4 is not limited to an individual, and may be an organization.

The data generator 6 is a person who is responsible for observing an event and converting the event into data. The data generator 6 is also a first data manager who firstly receives the data from the data entity 4. In this example, the data generator 6 is a doctor or a hospital that examines a patient, obtains and analyzes a specimen, and converts the analysis into data. In another example, the data generator 6 is a service operator who observes an event detected by a terminal, a sensor, or the like and converts the event into data.

A service provider 7 is an operator of a service using the MPC-ZKP system 2. The service provider 7 operates the MPC participating party group 10 or entrusts the operation to a third party. The service provider 7 may be referred to as a second data manager since the service provider 7 receives a share of data from the data generator 6 (first data manager) via the data entity 4. In a later described mode in which a third party is used, the service provider 7 may be referred to as a data processor.

The MPC participating parties 9 are servers that perform secret calculation and calculation (data processing) of evidence (proposition function) or proof (ZKP), and are individual servers constituting the MPC participating party group 10. The MPC participating party group 10 includes a plurality of MPC participating parties 9, and may be subjected to MPC between servers managed by a same organization, or may be subjected to MPC between servers (or between nodes) managed by a plurality of different organizations.

The verifier 8 is a person who uses proof/evidence (ZKP, output of proposition function) created by the second data manager (service provider, MPC participating party), and in this example, the verifier 8 is a management office of national borders, prefectural borders, and the like. The verifier 8 is a person who desires to verify certification and evidence. The service provider 7 may serve as the verifier 8.

The management server 22 is a server managed by a service provider using a scheme of secret calculation and zero-knowledge proof in the MPC-ZKP system 2, and manages the MPC participating party group 10. The management server 22 registers and stores a verification logic formula (which may also be referred to as a logic/arithmetic operation circuit) generated by the verifier 8, and provides the verification logic formula to a request source in response to a request from the data entity terminal 12, the data generator terminal 24, and the MPC participating party 9.

With reference to FIG. 1, a flow of processing beginning from registration of verification contents in the MPC-ZKP system 2 to generation of data used for verification, calculation of certification, and then verification will be described. Note that it is assumed that the data entity 4 and the verifier 8 have completed user registration to the management server 22 of the service provider 7 in advance and the data entity ID and the verifier ID have been issued respectively.

(1) The verifier 8 registers a verification logic formula from the verifier terminal 16 to the management server 22 that manages the MPC participating party group 10. At this time, a verification logic ID is assigned to the verification logic formula by the management server 22.

(2) The data entity terminal 12 confirms the verification logic ID requested by the verifier 8, and reads the verification logic formula associated with the verification logic ID from the management server 22 that manages the MPC participating party group 10. According to the verification logic formula, data and a data class (data format and requirements) and a calculation method (proposition function, calculation method of ZKP) used for the certification become unique. Thus, the data entity 4 specifies the data generator 6 (for example, a doctor, a hospital, or a public institution) that can observe the event and generate necessary data.

(3) The data entity 4 (patient) provides the verification logic ID to the data generator 6 (for example, a doctor and a hospital, a public institution) (via the data entity terminal 12). A data generator terminal 24 reads the verification logic formula associated with the verification logic from the management server 22. According to the verification logic formula, data and a data class (data formats and requirements) used for the certification become unique. When the data entity 4 (patient) accepts observation (for example, examination, testing, and identity confirmation) by the data generator 6 (for example, a doctor and a hospital, a public institutions) and evaluation is performed, the data of the evaluation result is read into the data generator terminal 24.

(4) The data generator terminal 24 processes the read data into a data class format, and applies a digital signature using a secret key sk of the public key cryptosystem of the data generator 6. Note that the public key pk of the data generator 6 can be obtained by, for example, PKI or the like. The generated data is defined as w. The digital signature of the data is defined as ws. A set of (w, ws) is referred to as a signed witness. The data generator terminal 24 stores the generated signed witness (w, ws) in the data generator DB 14.

(5) The data entity terminal 12 acquires and reads a signed witness (w, ws) from the data generator DB 14. In order to verify the validity of the received signed witness (w, ws), the data entity terminal 12 confirms that the completeness verification using the digital signature succeeds with the public key pk of the data generator acquired from PKI or the like. The data entity terminal 12 distributes the signed witness (w, ws) by the k-out-of-n threshold type secret distribution (n≥k≥2). The share obtained by the secret distribution of w is defined as $\{w0, w1, \ldots, wn-1\}$. Similarly, the share obtained by secret distribution of ws is defined as $\{ws0, ws1, \ldots, wsn-1\}$. A set of (wi, wsi) is referred to as a share of the signed witness. Note that in $i \in \{0, 1, \ldots, n\}$, n is the number of parties in the MPC participating party group 10.

(6) Upon receiving an operation indicating that the data entity 4 has agreed with the processing content (=verification logic formula, privacy policy) associated with the verification logic ID, the share (wi, wsi) of the signed witness is transmitted to each MPC participating party Pi of the MPC participating party group 10 from the data entity terminal 12.

(7) The MPC participating party group 10 calculates an evidence (proposition function) by the MPC on the basis of the verification logic formula associated with the verification logic ID using the share (wi, wsi) of the signed witness in each MPC participating party Pi and the public key pk of the data generator 6 acquired from PKI or the like. Each MPC participating party Pi obtains the share τi of the evidence.

(8) The verifier 8 receives a notification of the data entity ID from the data entity 4. The verifier terminal 16 of the verifier 8 is authenticated by each MPC participating party Pi of the MPC participating party group 10, obtains an output share $\{\tau0, \tau1, \ldots, \tau i\}$ of the evidence associated with both the verification logic ID and the data entity ID from the MPC participating party group 10 (obtains τi from the MPC participating party Pi), and obtains the evidence τ by performing reconstruction (that is, collecting the secret-distributed values and restoring the original value). In a case where the verifier 8 disagrees with the evidence τ, the verifier 8 inputs the disagreement to the verifier terminal 16. Upon receiving the input expressing the disagreement with the evidence, the verifier terminal 16 requests a proof by the zero-knowledge proof from the MPC participating party group 10. Alternatively, even in a case where the verifier 8 does not disagree with τ, zero-knowledge proof can be randomly requested to the MPC participating party group 10 from the verifier terminal 16.

(9) When accepting the request for a proof (that is, output of the proving procedure) by the zero-knowledge proof, each MPC participating party Pi of the MPC participating party group 10 performs calculation of the ZKP by the MPC based on the verification logic formula associated with the verification logic ID. In a case where the ZKP scheme (a type of ZKP) registered in the verification logic formula associated with the verification logic ID is, for example, Non-Interactive ZK (NIZK), the MPC participating party Pi obtains the output share $\{\pi0, \pi1, \ldots, \pi n-1\}$ of the proof that is the certification result. On the other hand, in a case where the ZKP scheme registered in the verification logic formula associated with the verification logic ID is, for example, Interactive ZK, the MPC participating party Pi (1) sends a commitment to the verifier terminal 16 of the verifier 8, (2) the verifier terminal 16 of the verifier 8 sends a challenge to each MPC participating party Pi of the MPC participating party group 10, and then (3) the MPC participating party Pi obtains an output share $\{\pi0, \pi1, \ldots, \pi n-1\}$ of the proof that is a certification result. Here, (2) and (3) may be repeated (Sounding Amplification).

(10) The verifier terminal 16 of the verifier 8 receives authentication from the MPC participating party group 10 with a credential or the like, acquires an output share $\{\pi0, \pi1, \ldots, \pi n-1\}$ of the proof associated with both the verification logic ID and the data entity ID from the MPC participating party group 10 (acquires πi from the MPC participating party Pi), performs reconstruction, and obtains π which is the proof. In addition, the CRS (additional information) necessary for the above-described verifying is acquired from the MPC participating party group 10 according to the ZKP scheme registered in the verification logic formula. The Verify is calculated, and the verifier terminal 16 of the verifier 8 performs acceptance or rejection regarding the verified content.

In the MPC-ZKP system 2 of FIG. 1, if the MPC participating party group 10 can collect data which belongs to a same individual and is generated by a plurality of data generators, it is possible to perform multi-dimensional certification regarding the same individual. Conventionally, it has been necessary to collect documents issued by a data generator, submit the documents to a verifier, and have the verifier verify the documents. This document often contains unnecessary information that the verifier does not need to know. In the MPC-ZKP system 2 of FIG. 1, the MPC participating party group 10 collectively performs the intended certification while protecting privacy.

In addition, the MPC participating party group 10 collects data of different persons while keeping the data secret, so that it is possible to perform certification combining the data of different persons without leaking their privacy. In order to perform the same operation with the conventional ZKP, plaintext needs to be in the same computer for calculation. In this case, privacy of at least one of the two persons leaks to someone other than the person. Also in this regard, in the MPC-ZKP system 2 of FIG. 1, the MPC participating party group 10 collectively performs the intended certification while protecting the privacy of the plurality of people.

Note that the data entity 4 may issue a new data entity ID separately from the previous data entity ID and then perform certification using the new data entity ID. As a result, the verifier can control so as not to be able to identify the past verification content.

As an application example of the MPC-ZKP system 2 of FIG. 1, a case is considered where the MPC-ZKP system 2 is applied to determination of whether or not to permit a person to travel under a situation that coronavirus spreads and there are restrictions of traveling between regions. At the time of traveling between regions, the management office desires to give permission to a person to travel after verifying that the infection probability of the person is extremely low. Since the expression "the infection probability is extremely low" may be defined in different ways, the management office prepares the following verification logic formula (signed CRS).

Verification logic formula: The infection probability is extremely low if the result of PCR testing at a hospital is negative and the person has been away from group infection regions within the past week.

A person who desires to travel to another region may take the following action in advance.

1. A service provider or an MPC participating party that has received a verification logic formula from a management office calculates the verification logic formula (example: Rank 1 Constraint System, Quadratic Arithmetic Program) and the CRS (additional information) of the data necessary for the operation of the verification logic.

2. When a data entity downloads the verification logic formula CRS (additional information) to a terminal, the data entity requests necessary data (example: visit a doctor, activate location information service) and receives necessary data from the data generator.

3. The calculation result (proof) is derived from the downloaded verification logic formula and the data.

4. Certification is performed by presenting the calculation result to the management office. At this time, when the data entity obtains the signed verification logic formula and CRS (additional information) of the service provider or the MPC participating party in advance, or the management office receives the verification logic formula and the additional information (CRS) from the service provider or the MPC participating party in advance, this certification can be performed offline (locally or in a closed network).

The MPC-ZKP system 2 according to the present embodiment enables entrusted certification for performing certification by registering the data of the above item 2 as being secret-distributed in the MPC participating party group 10, and performing calculation by the MPC between the MPC participating parties. In addition, since the logic is transferred via the service provider or the MPC participating party, a standard of certification is made common, and since circuit design and the setup necessary for ZKP are unified, it is possible to avoid redundancy of certification having the same purpose.

Figure 2:
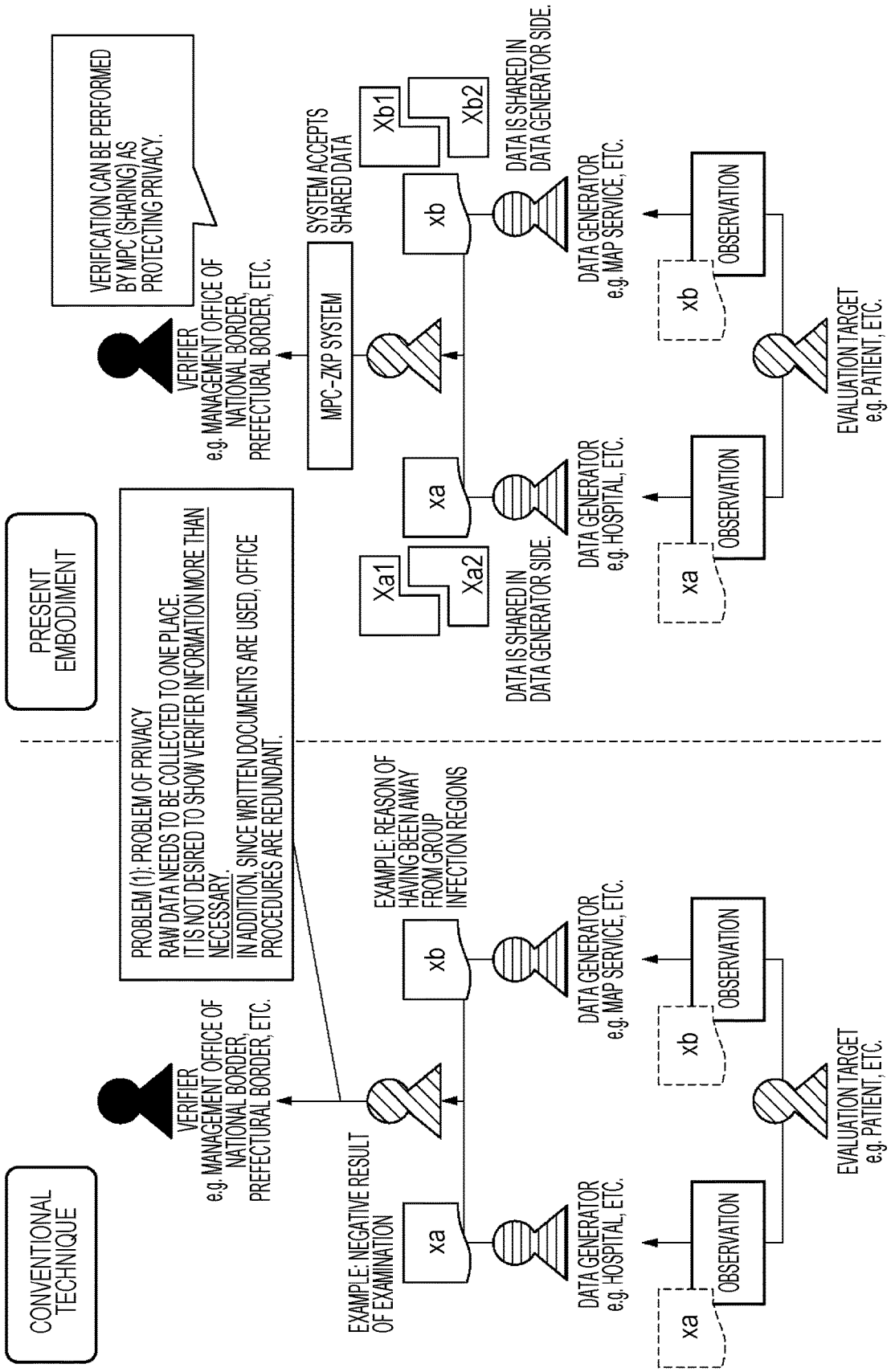
FIG. 2 is a schematic diagram for explaining confidentiality which is an advantage of using the MPC-ZKP system of FIG. 1.

FIG. 2 is a schematic diagram specifically describing confidentiality which is an advantage of using the MPC-ZKP system 2 of FIG. 1. The MPC-ZKP system 2 realizes confidentiality, that is, elimination of unnecessary information disclosure. Conventionally, a plurality of different types of data generators in hospitals and map service providers observe an evaluation target such as a patient, and each generates an observation result (for example, an examination result xa indicating negative/positive, a reason xb that says the target has been away from group infection regions, and the like). Then, these pieces of data xa and xb are collected in one place and judged to determine whether or not to permit the person to travel. The problem in the conventional technique is a problem related to privacy, which is, the raw data has to be gathered in one place. The evaluation target does not desire to show the verifier information more than necessary, and in this conventional technique, since data is exchanged by written documents, office procedures are redundant.

On the other hand, in a case where the MPC-ZKP system 2 according to the present embodiment is used, for example, data is shared on the data generator side (which may be performed by the data entity), and the share rather than the raw data is provided to the MPC-ZKP system 2. For example, xa indicating a negative/positive examination result is divided into two shares xa1 and xa2, and transmitted to different servers (that is, MPC participating parties). The reason xb indicating that the person has been away from the group infection region is similarly divided into two shares xb1 and xb2 and transmitted to different servers. (The MPC participating party group 10 of) The MPC-ZKP system 2 accepts the shared data (not the raw data itself) and provides the verification result to the verifier 8 (via the verifier terminal 16). In this manner, verification can be performed while privacy is protected by MPC (sharing).

Figure 3:
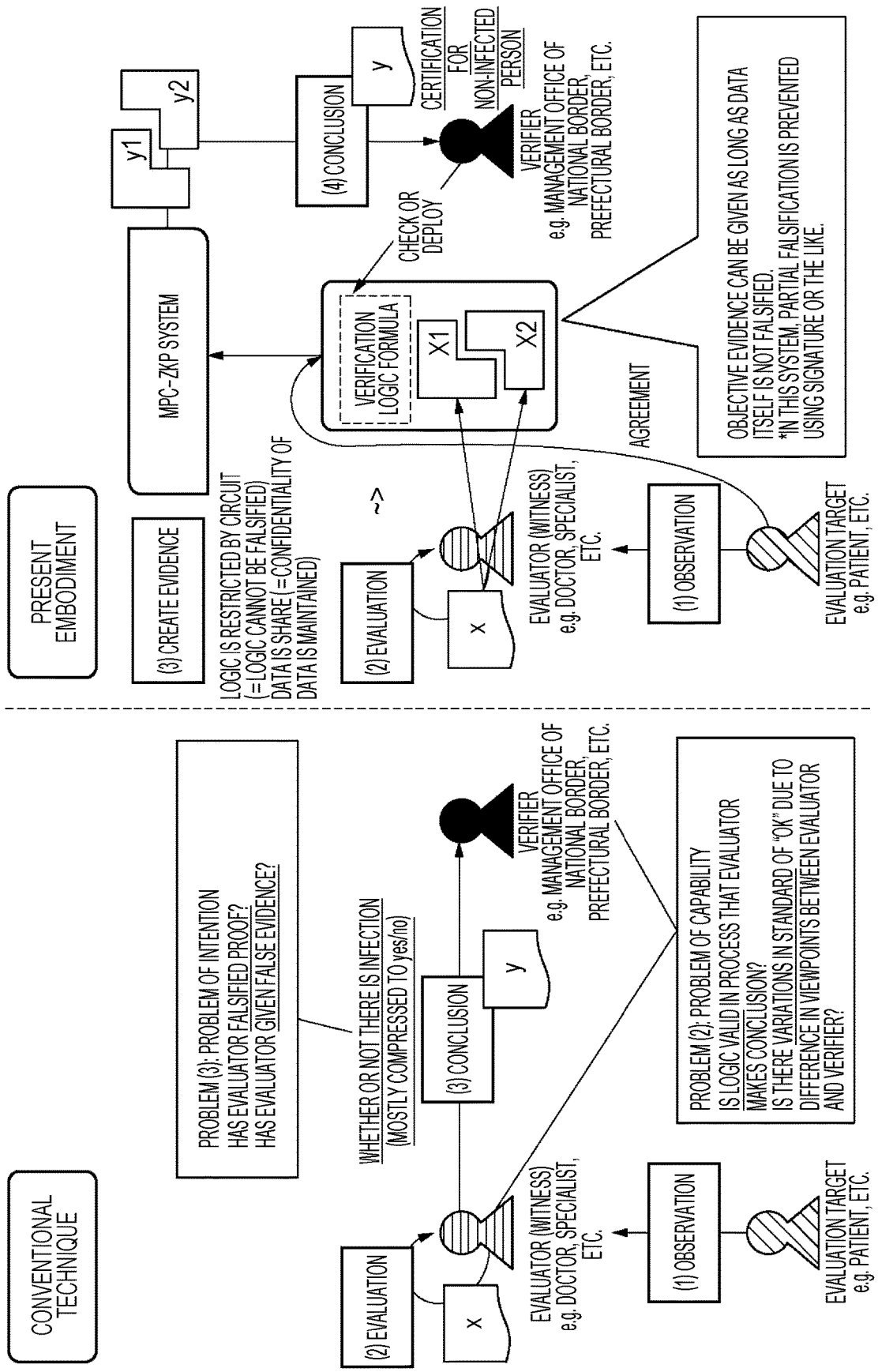
FIG. 3 is a schematic diagram for explaining logic transparency which is an advantage of using the MPC-ZKP system of FIG. 1.

FIG. 3 is a schematic diagram for explaining logic transparency which is an advantage of using the MPC-ZKP system 2 of FIG. 1. The MPC-ZKP system 2 ensures logic transparency and eliminates counterfeiting. Conventionally, an evaluator (witness) such as a doctor or a specialist observes an evaluation target such as a patient, evaluates data x of an observation result according to an evaluation logic, and provides a conclusion y which is an evaluation result to a verifier such as a management office of a national border, a prefectural border, or the like. The conclusion is often compressed to Yes/No, such as the presence or absence of infection. There are the following two problems of the conventional technique.

(1) Problem of Capability

One problem is whether the evaluation logic until the evaluator makes a conclusion is valid or not. A difference in viewpoints between the evaluator and the verifier may cause variations in the standard of "Accept".

(2) Problem of Intention

The evaluator may falsify the proof and may give false evidence.

On the other hand, when the MPC-ZKP system 2 according to the present embodiment is used, the data x is shared (In the example illustrated in FIG. 3, it is assumed that 2-out-of-2 secret distribution is performed, and the shares are represented by x1 and x2.), so that confidentiality of the data is maintained. The verification logic formula leaves the evaluator, is checked and deployed by the verifier, and is agreed upon by the evaluation target. Since this verification logic formula is bound by the CRS, falsification of the verification logic formula cannot be made. The verification logic formula and the share are provided to the MPC-ZKP system 2 where evidence is created. The verifier can obtain the certification of a non-infected person by collecting the output share (for example, y1 and y2) output by the MPC-ZKP system 2 and restoring the conclusion y. In this manner, as long as the data itself is not falsified, the evidence can be objective. For falsification of data itself, partial falsification measures can be taken by a signature or the like for the share by the data generator.

Figure 19:
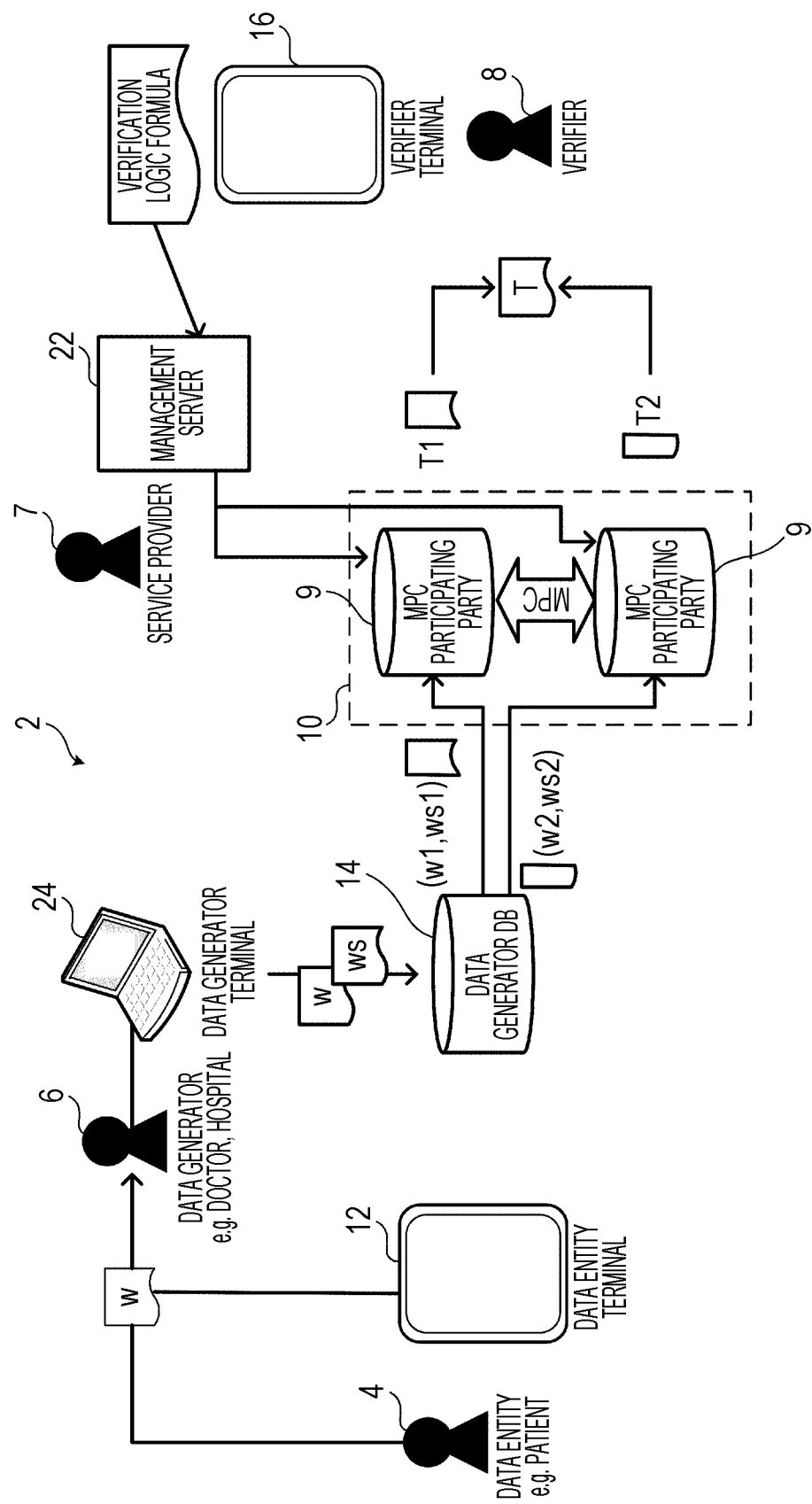
FIG. 19 is a schematic diagram illustrating a configuration of the MPC-ZKP system in a case where the data generator has obtained an agreement on provision to a third-party.

In the example of FIG. 1, the case where the data generator 6 does not acquire an agreement on the third-party provision of (the share of) the data from the data entity 4 has been described, but the present invention is not limited thereto, and the data generator 6 may be able to acquire an agreement on the third-party provision of the share of the data from the data entity 4. FIG. 19 is a schematic diagram illustrating a configuration of the MPC-ZKP system 2 in a case where the data generator 6 has obtained an agreement on provision to a third party. The signed witness (w, ws) is shared (wi, wsi) by the data generator 6 and provided from the data generator DB 14 to each MPC participating party 9 of the MPC participating party group 10 without passing through the data entity terminal 12.

Next, details of the MPC-ZKP system 2 will be described. FIG. 4 is a table illustrating features certification modes implemented in the MPC-ZKP system 2. The MPC-ZKP system 2 has three certification modes: (1) a zero-knowledge proof mode by a user terminal, (2) a proposition function evidence mode by an MPC, and (3) a zero-knowledge proof mode by an MPC, and a verifier 8 as a user can selectively use these three modes according to a requirement. The characteristics of each mode are as illustrated in FIG. 4. As illustrated in the figure, the proposition function evidence mode by the MPC does not have transparency of verification logic, but since the verifier can randomly or arbitrarily request certification by the zero-knowledge proof mode by the MPC or the zero-knowledge proof mode by the user terminal, it functions as a deterrent so that falsification cannot be made in the output of the proposition function evidence mode by the MPC. Since the zero-knowledge proof mode by the MPC has a huge amount of calculation, if the number of executions of this mode can be reduced, it contributes to shortening the total calculation time. Although there is no transparency of the verification logic in the proposition function evidence mode by the MPC, the conclusion (evidence) can be output more quickly compared to the zero-knowledge proof mode by the MPC. Therefore, by causing the verifier to arbitrarily or randomly execute the certification by the zero-knowledge proof mode by the MPC, it is possible to suppress the falsification from being performed in the evidence (the result of the proposition function) by the MPC in the proposition function evidence mode while reducing the scenes to which the calculation load is applied.

Next, a configuration of the verifier terminal 16 in FIG. 1 will be described. The hardware configuration of the verifier terminal 16 may have a hardware configuration similar to the hardware configuration described in FIG. 5 as will be described later with reference to FIG. 5.

A functional configuration example of the verifier terminal 16 will be described with reference to FIG. 16. The respective block diagrams illustrated in this figure can be implemented by hardware such as a computer CPU and other devices or the machinery or can be implemented by software such as a computer program, but in this description, the illustrated functional blocks are implemented by their cooperation. Thus, it will be understood by those skilled in the art having reference to this specification that these functional blocks can be implemented in various forms by a combination of hardware and software.

The verifier terminal 16 includes a verification logic formula acquisition unit 162, a verification logic formula deployment unit 164, an evidence request unit 165, a verification logic formula DB 166, a proof request unit 168, and a verification unit 170. In the verifier terminal 16, the output share collected from each MPC participating party 9 of the MPC participating party group 10 enables the verification of the proposition by the ZKP or the evidence.

The verification logic formula acquisition unit 162 reads an input data class available for the verification logic formula from the management server 22, and acquires (1) the relational formula of the object to be certified and (2) the ZKP scheme to be applied in the verification logic formula according to the input by the verifier 8. The verification logic formula acquisition unit 162 registers the acquired verification logic formula in the verification logic formula DB 166.

The verification logic formula deployment unit 164 deploys the verification logic formula registered in the verification logic formula DB 166 to the management server 22. Specifically, the verification logic formula deployment unit 164 registers the verification logic formula (expression representing Relation) and the ZKP scheme in the management server 22 of the service provider 7, and acquires the verification logic ID associated with the deployed verification logic formula. The verification logic formula acquisition unit 162 registers the verification logic formula and the verification logic ID in the verification logic formula DB 166 in association with each other.

The verification logic formula DB 166 manages the verification logic formula. FIG. 17 illustrates data stored in the verification logic formula DB 166. The data stored in the verification logic formula DB 166 includes, for example, a verification logic ID, a verification logic formula, and a ZKP scheme. Note that the verification logic formula DB 166 may be further associated with the verifier ID that has performed the registration, but may have a format similar to the data of the verification logic formula DB 118 provided in the management server 22 described later. The verifier 8 can view the data of the verification logic formula DB 166 at an arbitrary timing.

The evidence request unit 165 transmits an evidence request to each MPC participating party 9 of the MPC participating party group 10 to request evidence (proposition function) regarding the verification logic ID and the data entity ID correspondence value (details will be described later) (in response to the operation by the verifier 8). Note that, in the present embodiment, the case where the evidence request is transmitted to the MPC participating party 9 has been described as an example. However, the evidence request may be transmitted to the management server 22, and the management server 22 may request the evidence from each of the MPC participating parties 9.

The proof request unit 168 first requests the MPC participating party 9 for additional information associated with the verification logic ID and the data entity ID correspondence value. Subsequently, the MPC participating party 9 is requested for evidence (an output share ($\pi i$) of the proof) calculated by the MPC-ZKP system. For example, the proof request unit 168 generates a proof request on the basis of a request by an operation by the verifier 8 or a predetermined determination in the proof request unit 168, and transmits the evidence request to the MPC participating party 9. The proof request unit 168 may make the predetermined determination as follows. For example, immediately after acquiring the output share of the proposition function, the proof request unit 168 captures a locally generated random number or a transaction hash at a certain block height in a public chain (using a predetermined blockchain algorithm) after the share acquisition time as a random number, and determines whether the transaction hash exceeds a predetermined threshold. In a case where the random number or the transaction hash exceeds the predetermined threshold value, the proof request unit 168 generates a proof request (without waiting for a request by an operation by the verifier 8). In the present embodiment, the case where the request for the additional information and the proof request are transmitted to the MPC participating party 9 has been described as an example. However, the proof request may be transmitted to the management server 22, and the management server 22 may request the additional information and the proof to each MPC participating party 9.

The verification unit 170 acquires the output share of the evidence (proposition function) output from the MPC participating party 9, performs reconstruction, and acquires the evidence τ.

Furthermore, in a case where the evidence is requested, the verification unit 170 acquires the output share (πi) of the proof (ZKP) and the additional information associated with the verification logic formula from the MPC participating party 9. The verification unit 170 collects the acquired output share to restore the ZKP (proof). For example, the verification unit 170 authenticates the signed output share, the verification logic formula, and a CRS (in particular, a verification key) (when Trusted Setup is used) using the public key of the management server 22. In addition, the verification unit 170 performs verification using the restored ZKP (proof), the verification logic formula, and the verification key of the authenticated CRS (when Trusted Setup is used). The verification unit 170 outputs, for example, either acceptance (Accept) or rejection (Reject) as a verification result.

Figure 16:
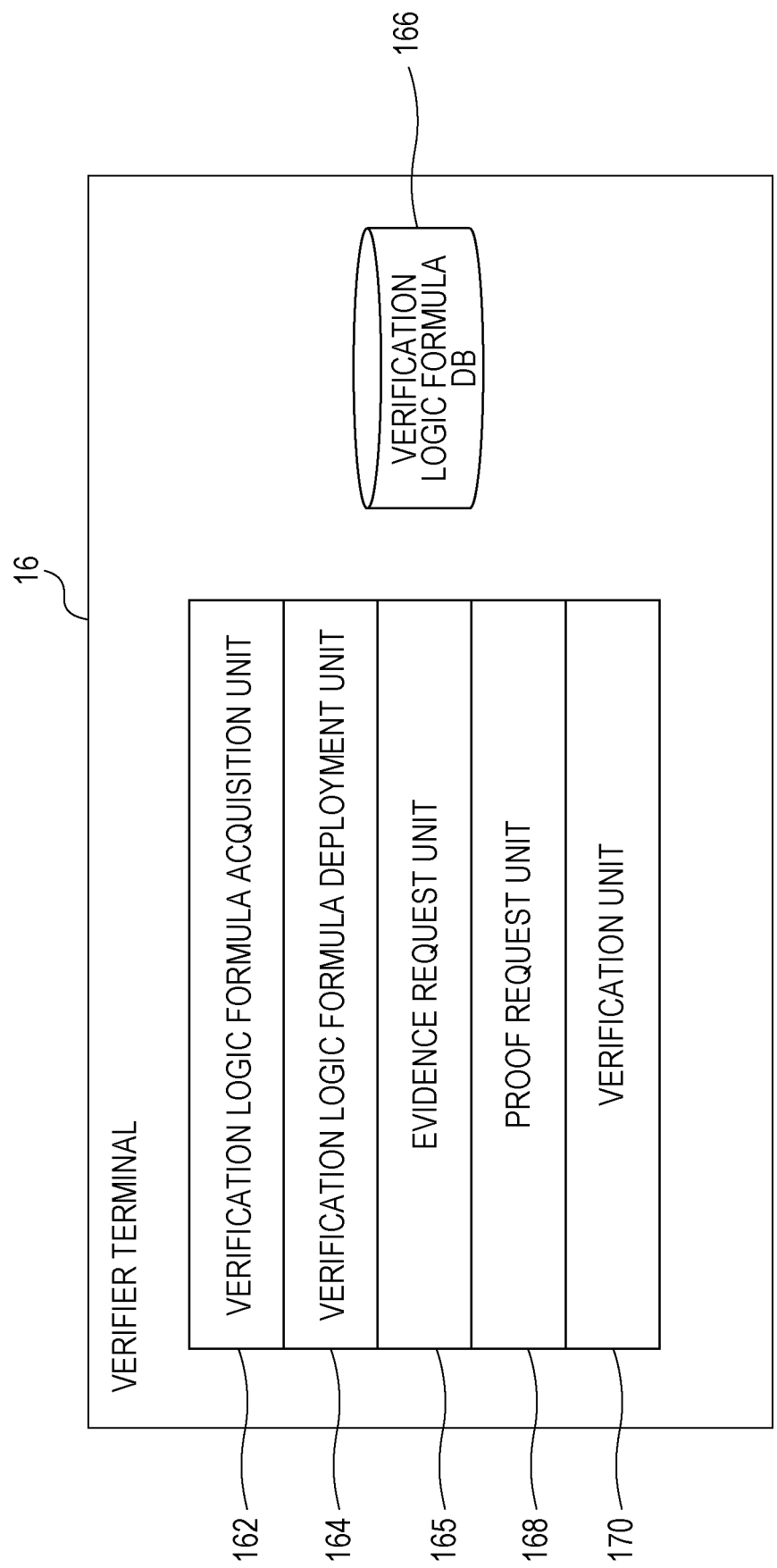
FIG. 16 is a block diagram illustrating a functional configuration example of the verifier terminal in FIG. 1.

Note that, although not explicitly illustrated in FIG. 16, the verifier terminal 16 may further include a verifier registration unit for registering the verifier 8 and acquiring a verifier ID uniquely specifying each verifier. For example, by providing the verifier ID to the data entity 4, the data entity 4 can implement desired access control for the verifier (when operating individual policies regarding handling of data).

Here, the above-described data entity ID correspondence value will be described. The data entity ID correspondence value is data for enabling personal data in the verification logic formula to be interchanged and enabling the verification logic formula to be used for certifying a combination of different individuals.

For example, a case of using the following as the verification logic formula will be considered. Note that the SigVerify function in the following verification logic formula represents a function that verifies the completeness of the value of a second argument with a digital signature of a third argument using a public key of a first argument.

<Verification logic formula>
DC008[0]+DC008[1]>10000000
&& SigVerify(DC012, DC008[0], DC013[0]]
==true
&& SigVerify(DC012, DC008[1], DC013[1]]
==true In this verification logic formula, DCxxx represents a data class, DC008 represents an annual income, DC012 represents a public key of a city hall, and DC013 represents a signature of the city hall for the annual income. "[0], [1], . . ." are suffixes and identify a specific object of each data class. For example, DC008[0] represents an annual income of Person A, and DC008[1] represents an annual income of Person B. This can be implemented by extracting a suffix from a variable in Abstract Syntax Trees (ASTs) of the verification logic formula. However, different expressions may be used for the bracket ([ ]) surrounding the suffix. For example, in a case where the formula of an existing programming language (C language or the like) is followed as the grammar of the verification logic formula, the formula may be separated by different symbols and different arrangements because of collision with the array formula.

The data entity ID correspondence value has a structure that enables designation of a data class target by substitution, and for example, when the data entity ID correspondence value is designated in an array format of [DS003, DS004], the data entity of DC008[0] and DC008[1] are set as:

DC008[0]=DS003, and DC008[1]=DS004 or the like.

In this case, the above verification logic formula is a formula meaning "whether the total annual income of two data entities who have received signatures from the same city hall exceeds ten million yen or not". In this manner, the created verification logic formula can be reused for certifying a combination of different individuals by changing the order (suffix of the array) of the data entity IDs arranged in the data entity ID correspondence value or designating another ID. Note that, in a case where the verification logic formula is a certification for one data entity, the above-described suffixes can be omitted, and a single data entity ID may be designated as the data entity ID correspondence value as it is.

Next, a configuration of the MPC participating party 9 (also referred to as an MPC participating server) will be described.

Figure 5:
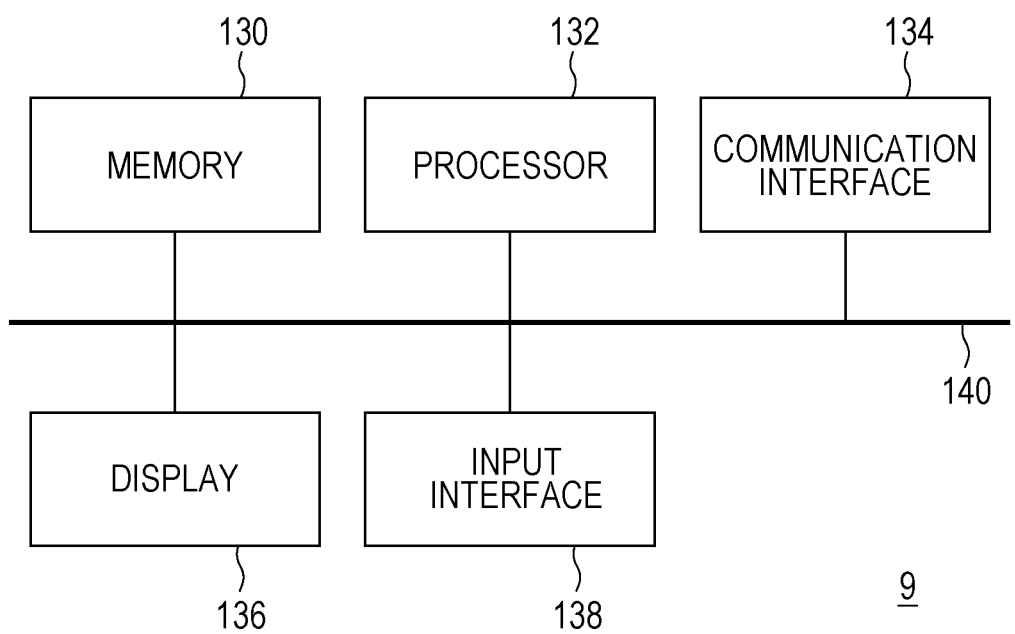
FIG. 5 is a hardware configuration diagram of an MPC participating party (MPC participating server) of the MPC participating party of FIG. 1.

FIG. 5 is an example of a hardware configuration diagram of the MPC participating party 9 of FIG. 1. The other MPC participating parties, the verifier terminal 16, the data entity terminal 12, and the data generator terminal 24 may also have a hardware configuration similar to the hardware configuration illustrated in FIG. 5. The MPC participating party 9 includes a memory 130, a processor 132, a communication interface 134, a display 136, and an input interface 138. These elements are each connected to a bus 140 and communicate with one another via the bus 140.

The memory 130 is a storage area for storing data and programs. The data and programs may be stored in the memory 130 permanently or temporarily. The processor 132 implements various functions in the MPC participating party 9 by executing the program stored in the memory 130. The communication interface 134 is an interface for transmitting and receiving data to and from the outside of the MPC participating party 9. For example, the communication interface 134 includes an interface for accessing a network, and exchanges data with other MPC participating servers, the data entity terminal 12, and the verifier terminal 16 via the network. The display 136 is a device for displaying various kinds of information, and is, for example, a liquid crystal display or an organic electroluminescence (EL) display. The input interface 138 is a device for receiving an input from the user. The input interface 138 includes, for example, a mouse, a keyboard, or a touch panel provided on the display 136.

Figure 6:
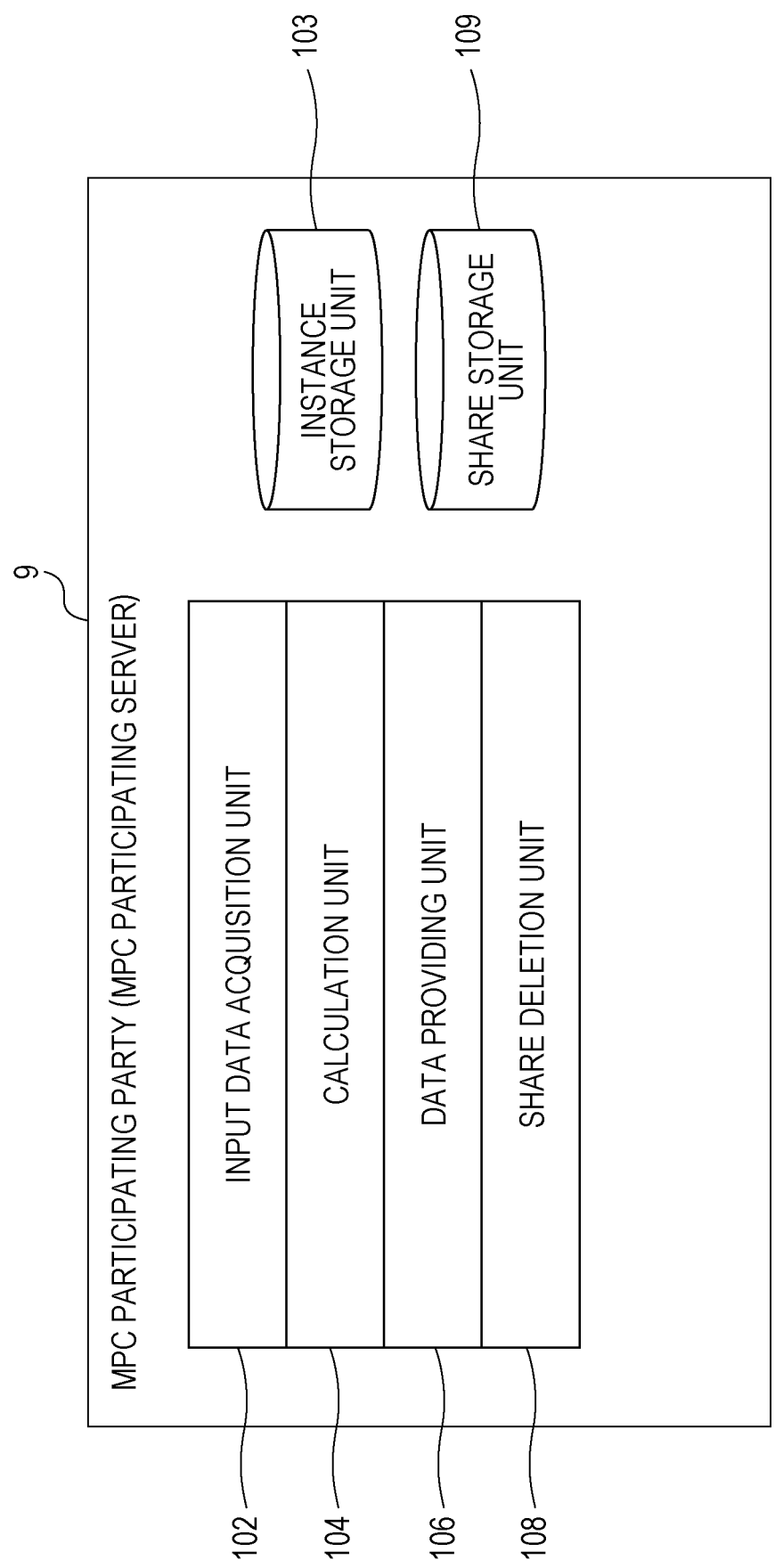
FIG. 6 is a block diagram illustrating a functional configuration example of an MPC participating party of the MPC participating party of FIG. 1.

FIG. 6 is a block diagram illustrating a functional configuration example of the MPC participating party 9 of FIG. 1. Each of the MPC participating parties 9 (that is, Pi) includes an input data acquisition unit 102, an instance storage unit 103, a calculation unit 104, a data providing unit 106, a share deletion unit 108, and a share storage unit 109.

The input data acquisition unit 102 acquires data related to the matter to be certified. There are two types of data: an instance and a share of a signed witness (share of witness). The input data acquisition unit 102 acquires an instance and a share (wi, wsi) of a signed witness secret-distributed from the data entity terminal 12 or the data generator terminal 24 via the network. Note that the various shares are expressed by $\{Pi, wi, wsi, vi, \tau i, \pi i | i \in \{0, 1, \ldots, n-1\}\}$, n is the number of MPC participating parties 9 in the MPC participating party group 10, that is, the number of parties participating in the MPC, and i makes each MPC participating party 9 unique (Pi). Note that, in a case where an instance is given by reference, the input data acquisition unit 102 further acquires its substance (for example, a public key of the data generator 6) via the network.

The input data acquisition unit 102 communicates between the MPC participating parties 9 of the MPC participating party group 10, and performs MPC processing on a verification algorithm of the completeness of the digital signature using the share of the signed witness (share of witness) as an input. Then, the MPC participating parties 9 share the output share (vi) obtained as a result, and perform reconstruction (restoring) the verification result (v). When confirming that the verification is successful, the input data acquisition unit 102 registers the share of the signed witness in the share storage unit 109. Furthermore, the input data acquisition unit 102 registers the instance in the instance storage unit 103. The share storage unit 109 and the instance storage unit 103 store these pieces of data in the format (for example, a set of a data entity ID, a data class ID, and a value) illustrated in FIG. 22.

The calculation unit 104 calculates the proposition function in response to receiving an evidence request from the verifier terminal 16, and calculates the ZKP in response to receiving a proof request from the verifier terminal 16.

(1) A case of receiving an evidence request from the verifier terminal 16 will be described. The calculation unit 104 receives an evidence request regarding the data entity ID correspondence value and the verification logic ID from the verifier terminal 16. Upon receiving the evidence request, the calculation unit 104 starts processing for executing the proposition function based on the data entity ID correspondence value and the verification logic ID.

The calculation unit 104 first acquires the verification logic formula and the verification logic ID from the management server 22. Further, it is determined whether or not the individual policies of all the data entity IDs included in the data entity ID correspondence value (obtained from the management server 22) satisfy the protection range indicated in the data of the individual policy DB. In a case where it is determined that the protection range is satisfied for all the data entity IDs, the calculation unit 104 calculates the proposition function according to the verification logic formula on the basis of the share of the data class included in the verification logic formula and the value of the instance.

The calculation unit 104 can transmit data related to the data entity ID correspondence value used for calculation (that is, privacy in which the data entity ID is leaked) to the management server 22 and cause the management server 22 to register the data entity ID in the verification history DB 142. In other words, the calculation unit 104 causes the management server 22 to manage what data regarding the data entity ID correspondence value has been used for the proposition calculation, and thus necessary privacy control is realized.

(2) Next, a case where the ZKP is calculated upon receiving a proof request from the verifier terminal 16 will be described. In this case, the calculation unit 104 receives a request for additional information regarding the data entity ID correspondence value and the verification logic ID from the verifier terminal 16 in advance, and acquires the additional information associated with the data entity ID correspondence value and the verification logic ID. The calculation unit 104 transmits the acquired additional information or the calculated additional information to the verifier terminal 16.

Since the verifier terminal 16 transmits the proof request in response to the reception of the additional information, the calculation unit 104 receives the proof request from the verifier terminal 16. Note that, in a case where the ZKP scheme of ZKP requested from the verifier terminal 16 is Interactive ZK, the calculation unit 104 receives challenge information from the verifier terminal 16 in addition to the data entity ID correspondence value and the verification logic ID. Upon receiving the proof request (or the proof request and the challenge information), the calculation unit 104 starts processing for execution of ZKP based on the data entity ID correspondence value and the verification logic ID.

The calculation unit 104 first acquires the verification logic formula and the verification logic ID from the management server 22. In addition, the calculation unit 104 reads the additional information transmitted to the verifier terminal 16 in advance. Here, the calculation unit 104 determines whether the protection range indicated in the data of the individual policy DB of the management server 22 is satisfied for all the individual policies of the data entity IDs included in the data entity ID correspondence value (obtained from the management server 22). In a case where it is determined that the protection range is satisfied for all the data entity IDs, the calculation unit 104 calculates ZKP according to the verification logic formula on the basis of the share of the data class included in the verification logic formula, the value of the instance, and the additional information. Thereafter, the calculation unit 104 stores the output share ($\pi$ share of proof, $\pi i$) obtained after the calculation of ZKP in the share storage unit 109.

Note that the above-described additional information may be stored in an additional information DB (not illustrated) in a data format illustrated in FIG. 23, for example, or may be stored in a memory for a predetermined period. The data of the additional information may be associated with the verification logic ID and the data entity ID correspondence value, for example, as illustrated in FIG. 23. The additional information may include a CRS or a commitment. The additional information varies according to a ZKP scheme, and when the ZKP scheme belongs to Interactive ZK such as Schnorr's Protocol, Sigma Protocol, or the like, the additional information includes, for example, a commitment. In a case where the ZKP scheme belongs to a non-interactive ZK (NIZK) seeking Trust for a specific party, such as zk-SNARKs or Groth Sahai, the additional information includes, for example, a common reference string (CRS). In addition, in a case where the ZKP scheme belongs to NIZK that does not seek Trust of a specific party, such as zk-STARKs of the RO assumption, the additional information includes, for example, a commitment (Merkle Tree, Merkle Tree Root).

In addition, the output share obtained by the proposition function or ZKP may be stored in the share storage unit 109 in a data format illustrated in FIG. 24, for example. In the data format illustrated in FIG. 24, for example, a proposition function associated with a data entity ID correspondence value and a verification logic ID, an output share of ZKP, and a calculation start date and time are stored.

When the calculation unit 104 executes the proposition function, the data providing unit 106 outputs the output share obtained as a result of the calculation to the verifier terminal 16. In addition, when the calculation unit 104 executes ZKP, the output share obtained as a result of the calculation and the additional information used in the calculation unit 104 are output to the verifier terminal 16. Furthermore, at this time, the data providing unit 106 may determine whether or not the individual policies of all the data entity IDs included in the data entity ID correspondence value (obtained from the management server 22) satisfy the protection range indicated in the data of the individual policy DB, and output the output share (further additional information in the case of ZKP) in a case where it is determined that the protection range is satisfied for all the data entity IDs.

When receiving a deletion request from the data entity terminal 12 used by the data entity 4 and/or the data generator terminal 24 used by the data generator 6, the share deletion unit 108 deletes the target share from the share storage unit 109.

Figure 7:
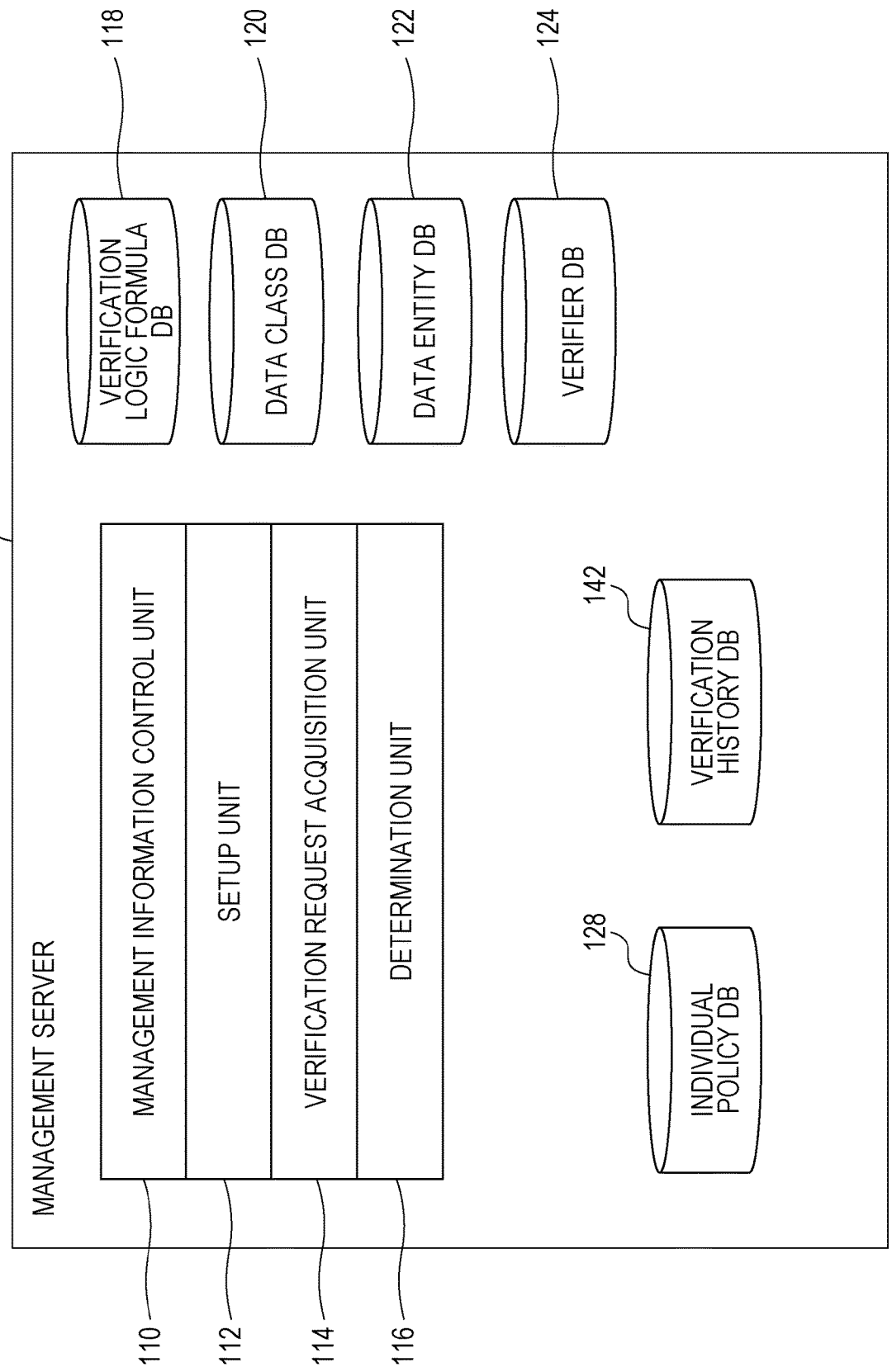
FIG. 7 is a block diagram illustrating a functional configuration example of a management server operated by a service provider to manage the MPC participating party group of FIG. 1.

FIG. 7 is a block diagram illustrating a functional configuration example of the management server 22 operated by the service provider 7 to manage the MPC participating party group 10 of FIG. 1. The management server 22 includes a management information control unit 110, a setup unit 112, a verification request acquisition unit 114, a determination unit 116, a verification logic formula DB 118, a data class DB 120, a data entity DB 122, a verifier DB 124, an individual policy DB 128, and a verification history DB 142.

The management information control unit 110 issues an ID that makes data (for example, a data entity, a verifier, a verification logic formula, a data class, and the like) registered in various DBs of the management server 22 unique. The data entity ID is information for uniquely specifying the data entity, and the management information control unit 110 issues an ID when registering the data entity. Note that the data entity is not limited to an individual, and may be an organization. The verifier ID is information for uniquely specifying the verifier, and the management information control unit 110 issues an ID when registering the verifier. Note that the service provider may be registered as a verifier in some cases. The verification logic ID includes a verification logic formula and a ZKP scheme (ZKP type). The verification logic ID uniquely identifies the combination of the verification logic formula and the type of ZKP. In the present embodiment, both the proposition function and the ZKP can be calculated based on the verification logic formula of the same form. The data class ID is information uniquely specifying a data class, the data class includes a class name (for example, "age") of data and a type (for example, a Boolean data type or the number of bits) of data, and when the data class ID is specified, the class of data and whether the class is public or private (that is, witness or instance) are uniquely specified. The management information control unit 110 issues a data class ID when registering the data class.

In addition, the management information control unit 110 transmits and receives data to and from the verifier terminal 16, the data entity terminal 12, the MPC participating party 9, or the like in the system 2, and controls writing and reading of data to and from the various DBs. Hereinafter, registration and the like of various data by the management information control unit 110 will be described.

(1) Control for Registering Data Entity Information

When the information of the data entity is registered in the data entity terminal 12, the management information control unit 110 acquires, from the data entity terminal 12, identity information such as a name and an address of the data entity and a signature for the identity information from an authentication authority, and registers the data in the data entity DB 122. At this time, the management information control unit 110 issues a data entity ID for a new data entity and transmits the data entity ID to the data entity terminal 12. For example, as illustrated in FIG. 9, the data entity DB 122 records data in which a data entity ID for specifying the data entity, a data class ID for specifying the data class, and data disclosed to the data entity are associated with each other. Note that the information of the ID recorded in the data entity DB 122 may be disclosed, and in a case where the information is disclosed, the information is treated as an instance. The information of the data entity recorded in the data entity DB 122 is recorded as a share in each of the MPC participating parties 9 and is concealed. When the data entity acquires a plurality of data entity IDs and uses the information of the data entity IDs for each purpose, the information is decentralized, and this prevents that the entire identity information of a single data entity is recognized by collecting a plurality of pieces of information of the data entity.

(2) Control for Registering Verifier Information

When the information of the verifier is registered in the verifier terminal 16, the management information control unit 110 acquires the identity information of the verifier from the verifier terminal 16 and registers data in the verifier DB 124. At this time, the management information control unit 110 issues a verifier ID for a new verifier and transmits the verifier ID to the verifier terminal 16. For example, as illustrated in FIG. 11, the verifier DB 124 records data in which the verifier ID, a verifier organization name, and a privilege reference flag are associated with each other. The privilege reference flag is a flag that indicates a verifier who has the privilege of being able to obtain an output share of evidence or proof regardless of set privacy policies. When the flag is set to "True" (for example, a service provider or an authorized government agency), it indicates that the user has the privilege.

(3) Control for Referring Data Class

When the verifier generates and edits the verification logic formula in the verifier terminal 16, the management information control unit 110 receives reference to the data class from the verifier terminal 16 and transmits information of the data class of the verifier terminal 16. The information of the data class is registered by, for example, the service provider or the data generator 6, and the management information control unit 110 issues a data class ID and registers the information in the data class DB 120 when the data class is registered. For example, as illustrated in FIG. 10, the data class DB 120 records data in which the data class ID, a data class name, a data format of the data class, data format details describing the data format in more detail, and a public classification are associated with each other. The data type is, for example, a Bool value or the number of bits. When the data class format is determined, the type (format) of the share of the data is also determined. Therefore, it can be said that the format of the share of the data is registered in the data class DB 120. Note that the data class whose public classification is set to be private is a witness, and the data class whose public classification is set to be public is an instance.

(4) Control for Registering and Referring Verification Logic Formula

When the verification logic formula is transmitted from the verifier terminal 16, the management information control unit 110 registers the verification logic formula in the verification logic formula DB 118. At this time, the management information control unit 110 issues a verification logic ID and transmits the issued verification logic ID to the verifier terminal 16. As illustrated in FIG. 8, the verification logic formula DB 118 records a verification logic ID that specifies a verification logic formula, a verification logic formula, and a ZKP scheme that identifies which ZKP algorithm (scheme) to use when executing ZKP in association with each other. The verification logic ID is a value obtained by converting the processing content (calculation formula) and the input data format (json, yaml, toml, etc.) into a hash value, and uniquely specifies the verification logic formula and the signed verification logic formula. The verification logic formula may be a pseudo code. In the verification logic formula, a predetermined specific symbol such as "#" may be used as a symbol for identifying the comment sentence in the pseudo code.

When the verifier terminal 16 accesses the verification logic ID and the verification logic formula in order to provide the verification logic ID and the verification logic formula to the MPC participating party 9, the management information control unit 110 provides the verification logic ID and the verification logic formula to the verifier terminal 16. Alternatively, in a case where there is a request from the verifier terminal 16 to provide the verification logic ID and the verification logic formula to the MPC participating party 9, the verification logic ID and the verification logic formula may be provided to the MPC participating party.

In addition, the management information control unit 110 transmits the verification logic ID and the verification logic formula to the data entity terminal 12 as necessary or in response to a request from the data entity terminal 12.

(5) Control for Registering Individual Policy

In response to receiving the registration request of the privacy policy for the verifier ID from the data entity terminal 12, the management information control unit 110 registers the privacy policy in the individual policy DB 128. As illustrated in FIG. 12, for example, the individual policy DB 128 records data in which a data entity ID for specifying a data entity for which a privacy policy is set, a data class ID for specifying a data class related to the privacy policy, a verification logic ID, a verifier ID for specifying a verifier who is a target of the privacy policy, a valid period of the privacy policy, and a protection range of the privacy policy are associated with each other.

The valid period indicates a period during which the privacy policy is applied, and is indicated in minutes in the example of FIG. 12. When the specified period has elapsed, the privacy policy is not protected. The protection range represents a range indicating to what extent the true value is allowed to be narrowed down by execution of a plurality of certifications. Specifically, data of a date of birth indicating Oct. 1, 1980 will be described as an example. For example, at the time point when the certification (1) that the date of birth of the data entity is 1975 or later (>19741231) and the certification (2) that the date of birth is 1996 or earlier (<19960101) are executed, privacy that the date of birth of the data entity is between 1975 and 1996 is leaked. However, for example, in a case where the period during which the privacy is leaked is larger than a value specified in the protection range, the certification (1) and the certification (2) are allowed. On the other hand, in a case where certification that the date of birth of the data entity is 1983 or earlier (<19840101) is performed, if the range in which the privacy is leaked becomes smaller than the value specified in the protection range (that is, it is narrowed down to a narrow range.), execution of the certification is rejected.

Note that examples of the measure of the value of the data class include a nominal scale (a scale used to distinguish concepts), an ordinal scale (a scale having meaning in magnitude relationship), a scale having meaning in an interval scale (a size of an interval, that is, a difference between notifications), a proportional scale (a scale having meaning in a ratio between numerical values as well as a difference between numerical values), and the like. The protection range described above can be set for an order deletion, an interval scale, and a proportional scale among these scales.

(6) Control for Registering and Referring Verification History

At the time of execution of the proposition function or the ZKP by the MPC participating party 9, the data of the verification history DB is referred to when the MPC participating party 9 determines whether or not the execution of the certification is contrary to the individual policy. At this time, the management information control unit 110 transmits the data of the corresponding verification history DB to the MPC participating party 9 in response to the reference request by the MPC participating party 9. In addition, after the execution of the proposition function or the ZKP by the MPC participating party 9, the management information control unit 110 accepts registration of the verification history from the MPC participating party 9. Specifically, for each data class (related to the data entity ID correspondence value) included in the verification logic formula used by the MPC participating party 9 to execute the proposition function or the ZKP, a request for registering an available upper limit value or lower limit value of data is transmitted to the management server 22. In this case, the management information control unit 110 registers the history information in the verification history DB 142. For example, as illustrated in FIG. 13, the verification history DB 142 records data in which, for example, a data entity ID, a data class ID, a verifier ID, a lower limit value, an upper limit value, final certification date and time of each, and the like are associated with each other. By recording the comparison (certification) with the instance in the verification logic as the record of the lower limit value and the upper limit value, it is possible to realize determination as to whether or not to execute certification using the individual policy. Note that the item related to the last certification date and time may be filled with a predetermined value (for example, 99999999) for handling the last certification date and time as a future value from the certification execution time point when ZKP is executed by NIZK.

As described above, the order of processing such as registration and reference by the management information control unit 110 may be controlled in order of the control for registering the data entity information, the control for registering the verifier information, the control for referring the data class, the control for registering and referring the verification logic formula, the control for registering the individual policy, and the control for registering and referring the verification history. Alternatively, the management information control unit 110 may perform the control for registering the individual policy at an arbitrary timing, or may perform the control for registering of the individual policy in response to reception of a notification indicating that the certification request by the verifier has been received from the MPC participating party 9.

The setup unit 112 generates an algorithm and a signed CRS. When the verification logic formula is deployed, the setup unit 112 generates a protocol for the MPC for calculating the ZKP corresponding to the verification logic formula by the MPC. In addition, the setup unit 112 calculates the CRS. When the ZKP scheme requires Trusted Setup, not only the management server 22 but also all the MPC participating parties 9 cooperate to make it difficult to collude. The setup unit 112 digitally signs the generated CRS. The setup unit 112 distributes the generated protocol and signed CRS to each MPC participating party 9.

Returning to FIG. 7, the verification request acquisition unit 114 acquires the evidence request or the proof request from the verifier terminal 16 of the verifier 8 via the network. The evidence request and the proof request include, for example, a data entity ID correspondence value and a verification logic ID of a verification logic formula obtained by the verifier 8.

In response to the acquired verification request, the determination unit 116 determines whether or not to reject the verification request from the viewpoint of output privacy protection. The determination unit 116 determines whether to reject the verification request by using the data stored in the individual policy DB 128 and the verification history DB 142.

The viewpoint of output privacy protection (according to the query audit method described above) will be described more specifically. In general, the original data is not directly known to the verifier by the proposition function or ZKP. However, in a case where verification for data of the same data class by the verifier is not limited (as described in the control for registering the individual policy), there is a possibility that the original data may leak as a result of repeating the verification. For example, dealing with the selected plaintext may become a problem, and particularly, calculation using a class having a narrow range of possible values is likely to become a problem.

For example, regarding age,
50 years old or older?→False
25 years old or older?→True
37 years old or older?→False
31 years old or older?→True
34 years old or older?→True
35 years old or older?→False Although the correct age cannot be known from each verification result, by repeating the verification as described above, the possible range of the actual age can be narrowed down, or it is specified that the data entity is 34 years old when a plurality of verification results are combined.

In the protection of the output privacy according to the present embodiment, in order to maximize protection of privacy (output privacy) that cannot be protected by the MPC-ZKP, the MPC participating party 9 or the service provider 7 plays the role of a circuit breaker. The verification logic requested by verifier 8 causes MPC participating party 9 or service provider 7 to reject computations of a proposition function or ZKP that significantly compromise privacy. In that sense, the MPC participating party 9 or service provider 7 serves as a circuit breaker in protecting output privacy. Note that the criterion of the compromise may be determined by the nature of the service and agreement with the consumer.

The output privacy protection function realized by the management server 22 determines a category of privacy that the data entity 4 allows the verifier 8 to know based on the individual policy DB 128, and the determination unit 116 protects the data entity 4 from a threat to the output privacy for data of the ordinal scale or more. The determination unit 116 determines whether or not to reject the verification request based on the content of the verification request acquired by the verification request acquisition unit 114, the privacy policy stored in the individual policy DB 128, and the verification history stored in the verification history DB 142.

More specifically, when a proposition function or ZKP that violates the privacy policy is requested by the verifier 8, the determination unit 116 rejects calculation (or the determination unit 116 causes the MPC participating party 9 to reject the calculation). A specific example of a privacy policy that may be stored in the individual policy DB 128 is as follows.

Policy 1: To avoid leakage of privacy beyond a certain level to a specific verifier within a certain period (for example, within two years).

Policy 2: To avoid leakage of privacy beyond a certain level to a specific verifier.

Policy 3: To avoid leakage of privacy beyond a certain level to all verifiers within a certain period of time.

Policy 4: To avoid leakage of privacy beyond a certain level to all verifiers.

"Privacy beyond a certain level" indicated in the above description of the privacy policy can be individually set for each data entity. For example, it is determined by conditions such as "age is not desired to be specified with an error in units of 10 years (e.g., less than 40 years old and 30 years old or older)" and "savings is not desired to be specified with an error in units of one million yen".

Such a privacy policy is managed in the individual policy DB 128 for each data entity and the type of data (data class) (examples: age, income, etc.). In a case where a proposition function or ZKP contrary to the privacy policy is requested, the determination unit 116 rejects the verification request so as to protect the data entity 4 from a threat to output privacy.

In a case where the verification request is approved, the determination unit 116 causes each MPC participating party 9 of the MPC participating party group 10 to execute the proposition function or the ZKP, and causes the verifier terminal 16 to provide the output share obtained as a result. Alternatively, in a case where the verification request is approved, the determination unit 116 provides the verifier terminal 16 with the corresponding output share stored in the verifier DB 124.

Figure 21:
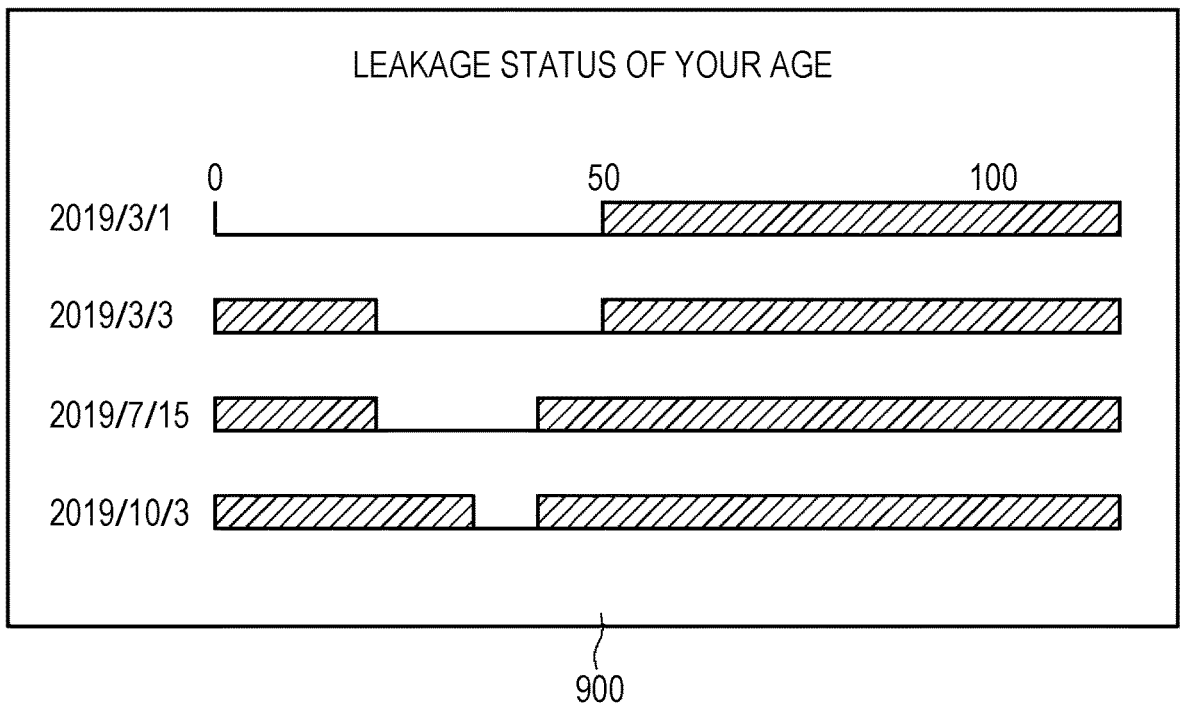
FIG. 21 is a representative screen view of an output privacy leakage notification screen displayed on a display of the data entity terminal of the data entity.

FIG. 21 is a representative screen view of an output privacy leakage notification screen 900 displayed on the display of the data entity terminal 12 of the data entity 4. The output privacy leakage notification screen 900 is generated by referring to the verification history DB 142, and presents the privacy range leaked by the proposition function or the ZKP to the data entity 4. In the example illustrated in FIG. 21, the range of age used for determination of verification is indicated by hatching. Although the one-dimensional display is adopted in FIG. 21, a two-dimensional display such as a Venn diagram may be adopted.

Figure 14:
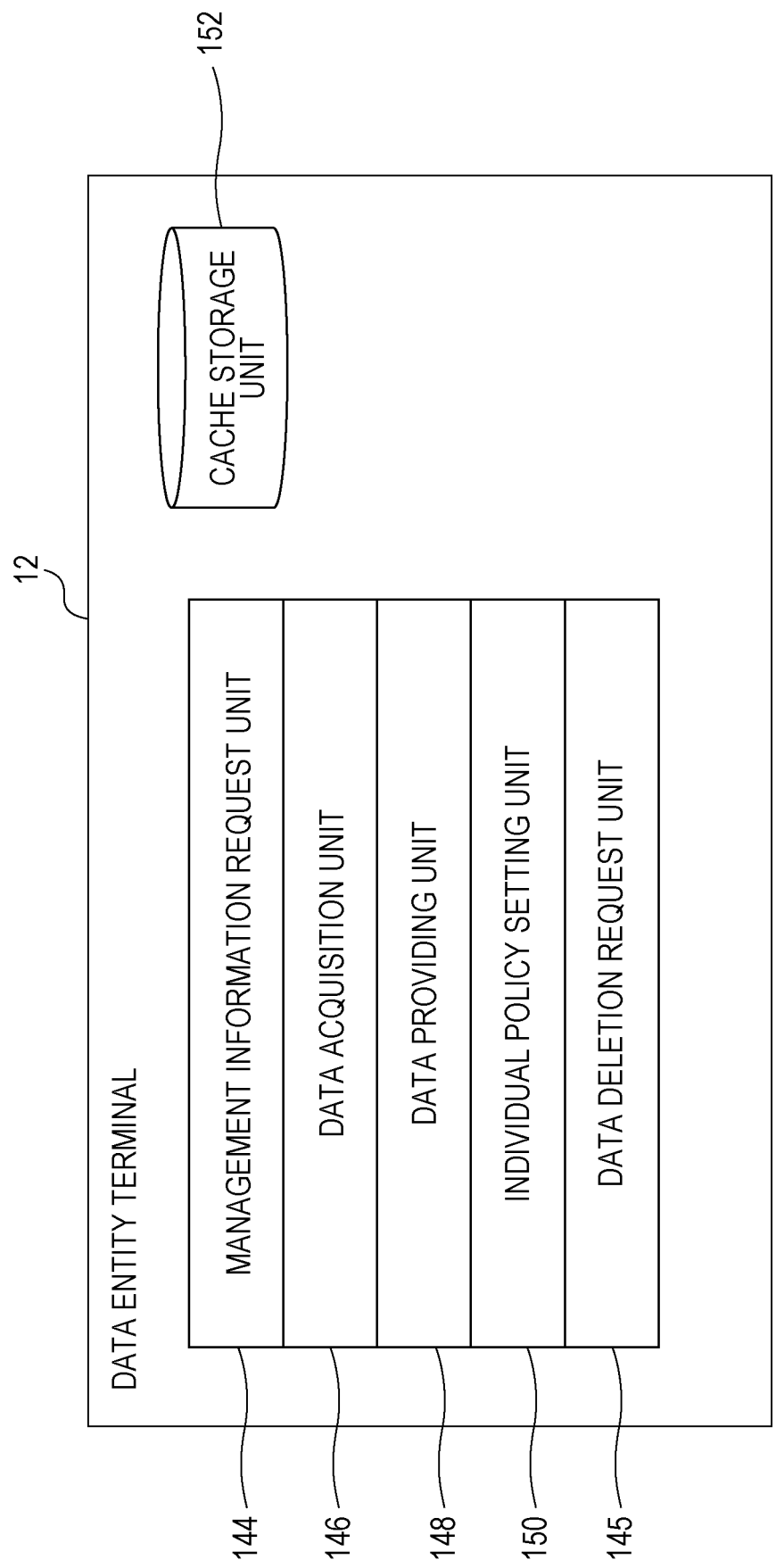
FIG. 14 is a block diagram illustrating a functional configuration example of the data entity terminal in FIG. 1.

FIG. 14 is a block diagram illustrating a functional configuration example of the data entity terminal 12 in FIG. 1. The data entity terminal 12 includes a management information request unit 144, a data acquisition unit 146, a data providing unit 148, an individual policy setting unit 150, and a data deletion request unit 145.

The management information request unit 144 requests the management server 22 of the service provider 7 for management information (in particular, a verification logic formula). The management information request unit 144 acquires the management information associated with the verification logic ID and displays the management information on the display. The data entity 4 can view and confirm the verification logic formula requested by the verifier 8, and can request the data generator 6 to generate necessary data (for example, examined at a hospital).

When the signed witness (w, ws) is stored in the data generator DB 14 of the data generator 6 (by the data generator 6 or the data generator terminal 24), the data acquisition unit 146 acquires the signed witness from the data generator DB 14 and registers the signed witness in the cache storage unit 152. In addition, the data acquisition unit 146 acquires a necessary instance (for example, a public key of the data generator 6) from the outside and registers the acquired instance in the cache storage unit 152.

The data providing unit 148 sets the signed witness (w, ws) stored in the cache storage unit 152 as a share and provides the share (wi, wsi) of each signed witness (i=0 to the number of MPC participating parties −1) to each MPC participating party 9 of the MPC participating party group 10 (that is, secret distribution). The data providing unit 148 provides not only the share of the signed witness but also the instance to each MPC participating party 9.

The individual policy setting unit 150 reads the data class from the management server 22 and sets the privacy policy for each data class. For example, a privacy policy is set for each data class according to an operation by the data entity 4, and the privacy policy is set for the management server. Furthermore, the individual policy setting unit 150 can set which verifier (verifier ID) is to be granted certification permission according to the operation by the data entity 4.

The data deletion request unit 145 can request deletion of the share stored in the MPC participating party 9 of the MPC participating party group 10.

Note that, although not explicitly illustrated in FIG. 14, the data entity terminal 12 may further include a data entity registration unit for performing registration of a data entity (name and address of the data entity) and acquiring a data entity ID that uniquely identifies each verifier. At this time, a signature (for example, information capable of confirming authentication by a public institution) to the information of the data entity ID may be provided.

Figure 15:
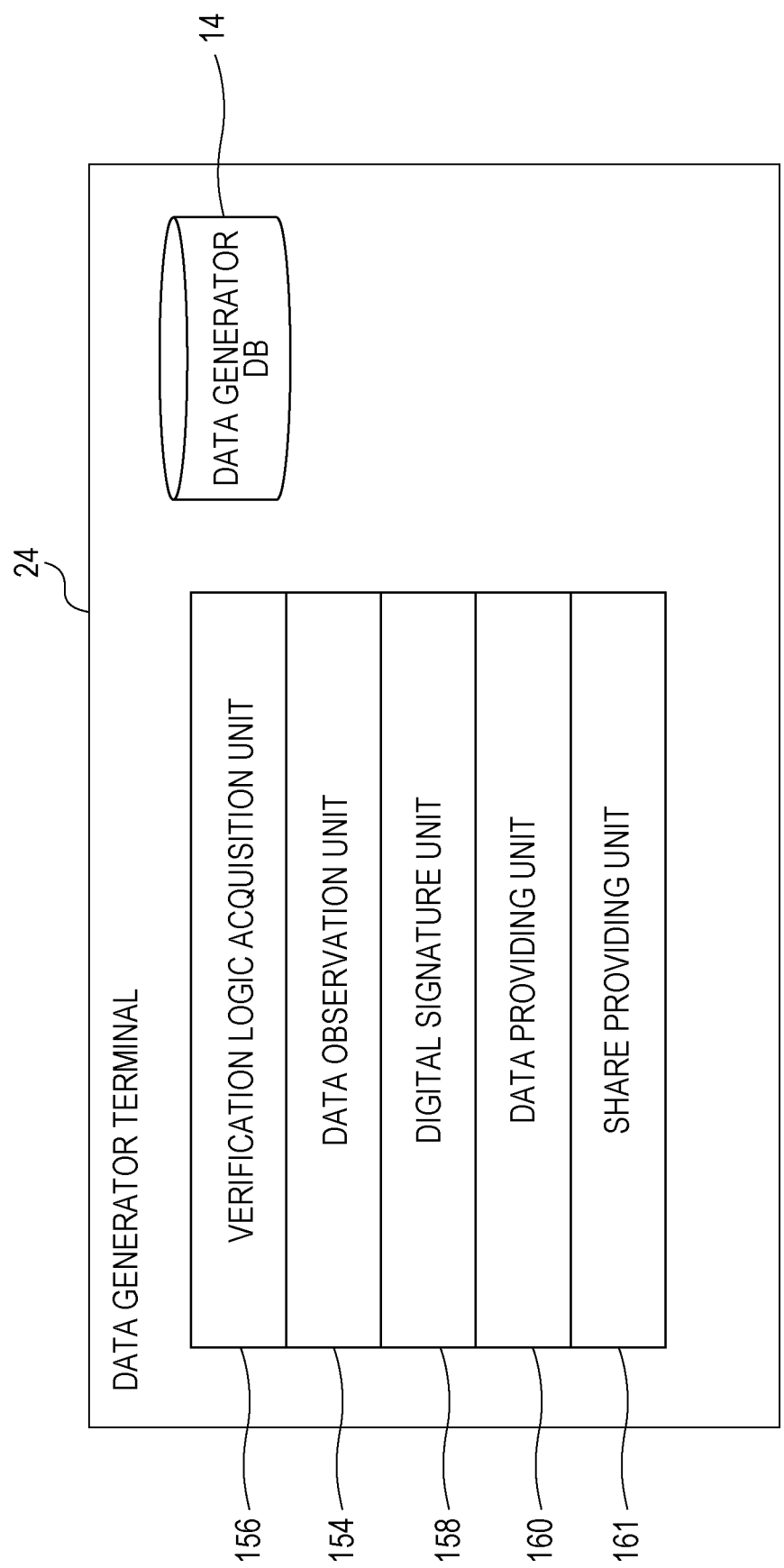
FIG. 15 is a block diagram illustrating a functional configuration example of a data generator terminal which is a terminal of a data generator.

FIG. 15 is a block diagram illustrating a functional configuration example of the data generator terminal 24. The data generator terminal 24 includes a verification logic acquisition unit 156, a data observation unit 154, a digital signature unit 158, a data providing unit 160, a share providing unit 161, and a data generator DB 14.

The verification logic acquisition unit 156 reads the verification logic from the management server 22 and displays the verification logic on, for example, a display. As a result, the data generator 6 can confirm and understand necessary data and its format.

The data observation unit 154 generates data related to the matter to be certified. In an example in which the data generator 6 is a doctor or a hospital, the generated data is an examination result, an analysis result of a specimen, or the like. The data observation unit 154 registers the generated data (for example, the witness (secret information) of the generated data) in the data generator DB 14. Note that an instance (public information) of the generated data may also be stored in the data generator DB 14. The data observation unit 154 may further register a data entity ID and a data class ID of each data together.

The digital signature unit 158 generates a signed witness by applying a digital signature (for example, signature with a secret key of a data generator) to the data (witness) generated by the data observation unit 154, and registers the signed witness in the data generator DB 14. Furthermore, the digital signature unit 158 may generate a signature for the instance and register the signature in the data generator DB 14.

The share providing unit 161 creates a signature and a share of data by sharing the signed witness generated by the digital signature unit 158, and further adds a signature to each share. The share providing unit 161 can provide the generated signed share to the MPC participating party 9. Note that the share providing unit 161 may be invalidated in a case where the share is provided from the data entity terminal 12 to the MPC participating party 9. On the other hand, as illustrated in FIG. 19, in the configuration in which the share is provided from the data generator terminal 24 and the data generator DB 14 to the MPC participating party 9, the sharing is enabled.

The data providing unit 160 provides the data entity 4 and the corresponding signed share to the data entity terminal 12 in response to a request from the data entity terminal 12. In a case where the data entity 4 has agreed in advance, the data providing unit 160 can provide the generated data to another person or another company.

The operation of the MPC-ZKP system 2 having the above configuration will be described.

Figure 18:
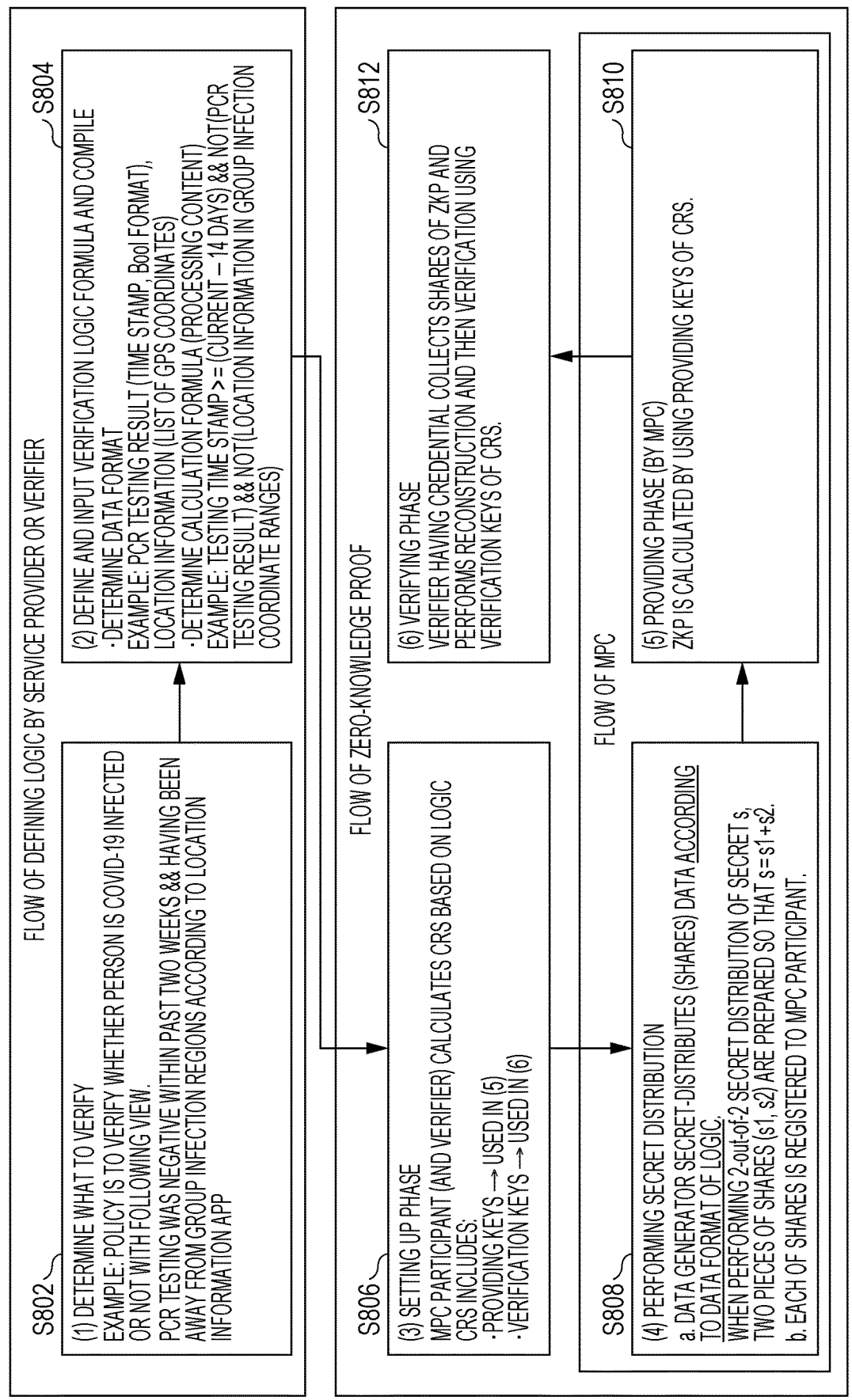
FIG. 18 is a chart illustrating a flow of a sequence of certification in the MPC-ZKP system.

FIG. 18 is a chart illustrating a flow of a sequence of certification in the MPC-ZKP system 2. FIG. 18 illustrates a case where zk-SNARKs is adopted as the algorithm of ZKP. The sequence in FIG. 18 corresponds to the zero-knowledge proof mode by the MPC and the zero-knowledge proof mode by the user terminal described above. The sequence of FIG. 18 includes steps S802, S804, S806, S808, S810, and S812, of which steps S802 and S804 indicate a flow of definition of verification logic by the service provider 7 or the verifier 8, steps S806, S808, S810, and S812 indicate a flow of ZKP, and steps S808 and S810 indicate a flow of MPC. Note that steps S808 and S810 are performed in the case of the zero-knowledge proof mode by the MPC, and are not performed in the zero-knowledge proof mode by the user terminal.

In this sequence, first, contents to be certified (to be verified) are defined (step S802), and a verification logic formula thereof is generated (step S804). The verification logic may be prepared by the verifier 8 or may be prepared in advance by the service provider 7 as "well verified content". The verification logic formula includes a calculation expression (processing content) and a format of input data (json, yaml, toml, etc.). In addition, a ZKP scheme is associated with the verification logic formula. In the verification logic, there are for the proposition function and for the ZKP. In this sequence, for ZKP is assumed, and for the proposition function will be described later. Upon receiving the verification logic formula, the management server 22 issues a verification logic ID.

The verifier terminal 16 of the verifier 8 or the MPC participating party 9 calculates a verification logic formula necessary for certifying the verification logic and the CRS (when Trusted Setup is used) (step S806). The calculation of the CRS may be performed by ordinary calculation by the MPC participating party 9 (the MPC using the shared value may not be performed). However, when the ZKP scheme adopted requires Trusted Setup, the MPC participating parties 9 (and verifier 8) perform the setting up phase in cooperation.

However, in a case of adopting a scheme that relies on security (random oracle assumption) of a hash function, such as zk-STARKs, Trusted Setup is unnecessary.

In step S808, data necessary for certification is acquired.

<When ZKP is Calculated by MPC and Provision of Data to a Third Party is Assumed>

When the signed share necessary for verification is not registered, the MPC participating party 9 requests the data generator terminal 24 of the data generator 6 to perform the signed share in response to a request from the data entity 4 or the service provider 7. Alternatively, the following data provision may be automatically proceeded from the data generator terminal 24 of the data generator 6.

The data generator terminal 24 of the data generator 6 acquires the verification logic formula from the management server 22 of the service provider 7, and prepares a signed share of the requested data, that is, a value obtained by secret distribution (sharing) of the plaintext, a value obtained by secret distribution (sharing) of the signature to the plaintext, and a value obtained by signing each share according to the format of the input data. The data generator terminal 24 distributes each signed share one by one to the MPC participating server 20 of the MPC participating party 9.

The MPC participating party 9 acquires the public key of the data generator 6 and verifies the completeness of the share of the signature and the signed share each received.

<When ZKP is Calculated by MPC and Data is not Provided to Third Party>

When the data necessary for verification is not registered, the data entity terminal 12 acquires the verification logic formula from the management server 22 of the service provider 7, and requests the data generator terminal 24 to sign the plaintext and the plaintext of the data necessary for certification according to the format of the input data.

The data generator terminal 24 prepares a plaintext of the requested data and a signature for the plaintext.

The data generator terminal 24 provides these to the data entity terminal 12.

The data entity terminal 12 verifies the completeness by the digital signature using the public key of the data generator 6.

The data entity terminal 12 secret-distributes (shares) the plaintext and the signature data for the plaintext acquired from the data generator terminal 24 to generate a signed share (for example, a share of a signed witness), and distributes each signed share one by one to the MPC participating party 9.

The MPC participating party 9 obtains the public key of the data generator 6 and verifies the completeness of the signed share (e.g., the signed witness share) each received.

<When ZKP is Calculated on the Data Entity Terminal 12 of the Data Entity 4>

On the basis of the input data ID associated with the verification logic ID, data registration (whether or not the data has been saved) is confirmed on the local data entity terminal 12. In a case where not registered, the data entity terminal 12 requests the data generator terminal 24 for data necessary for certification. The data generator terminal 24 prepares a plaintext of the requested data and a signature for the plaintext. The data generator terminal 24 provides all these pieces to the data entity terminal 12. The data entity terminal 12 confirms that the signature can be correctly authenticated using the public key of the data generator 6. The data entity terminal 12 registers the data on the local data entity terminal 12.

In step S810, the certifier calculates the ZKP.

<When Certifier=MPC Participating Party 9>

The MPC participating party 9 calculates the ZKP based on the verification logic formula associated with the target verification logic ID or the CRS in the case of using Trusted Setup.

Note that the calculation of the ZKP may be limited to a case where the verification logic formula satisfies the condition of the privacy policy of the individual privacy as described above.

Each output share is stored in the MPC participating party 9 while the ZKP of the calculation result remains shared as the output share. At this time, the management server 22 may also issue a credential for authentication with respect to acquisition of an output share that is a ZKP share, issue a credential ID, and associate the credential IDs. In this case, the service provider 7 directly notifies the verifier of the information associated with the credential ID after obtaining the prior/subsequent consent of the data entity. Alternatively, it is also possible to notify the data entity 4 of the information associated with the credential ID, notify only the other party (verifier 8) whom the data entity 4 desires to certify of the information associated with the credential ID, and make it possible to provide the certification associated with the attribute of the person.

As described above, by using the credential, the data entity 4 associated with the certification ID can control whether or not the verifier 8 can access the proof (ZKP) by registering/deleting the information of the credential after calculating the ZKP (determine whether or not to permit and give an instruction to the system). The MPC participating party 9 provides the output share of the ZKP online only to the verifier 8 who has obtained certification of the data entity 4 (online certification). However, in a special situation in which there is an inconvenience in a case where the referring is recognized by the data entity, such as reference of investigation related matters, the handling is based on the determination of the service provider and is not limited thereto.

The calculation result may be distributed to the data entity terminal 12, and the data entity 4 may cause the verifier 8 to refer to the calculation result (offline certification).

<When Certifier=(Data Entity Terminal 12 of) Data Entity 4>

The data entity terminal 12 requests the MPC participating party 9 or the management server 22 for the verification logic formula associated with the target verification logic ID or the CRS in a case where Trusted Setup is used.

The data entity terminal 12 calculates the ZKP based on the acquired verification logic formula or CRS.

The calculation result is kept in the data entity terminal 12 and the data entity 4 let the verifier 8 refer to the calculation result (offline certification). Alternatively, the calculation result may be sent to the service provider 7 so that the verifier 8 can verify it online (online certification). In a case where the online certification is enabled, the data entity 4 associated with the certification ID can control whether or not the verifier 8 can access the proof (ZKP) by registering/deleting the information associated with the credential ID (can determine whether or not permit and give an instruction to the system). The MPC participating party 9 provides the output share of the ZKP online only to the verifier 8 who has obtained certification of the data entity 4 (online certification).

In step S812, the verifier 8 verifies ZKP.

<When ZKP Holder=MPC Participating Party 9>

The verifier terminal 16 of the verifier 8 acquires proof (output share of ZKP) from the MPC participating party 9. Note that the output share of the ZKP may be provided only in a case where the verification logic formula satisfies the condition of the privacy policy of the individual privacy as described above, or in a case where the verifier 8 is permitted to access the output share by the credential. For example, in a case where access control is performed with a credential, the service provider directly notifies the verifier of information associated with the credential ID after obtaining a prior and subsequent consent of the data entity. Alternatively, the data entity 4 provides the verifier 8 with information associated with the credential ID in advance. The verifier terminal 16 of the verifier 8 obtains a credential associated with the notified credential ID, proof (output share of ZKP), a verification logic formula, or a CRS in a case where Trusted Setup is used, with authentication of the verifier ID. The verifier terminal 16 restores ZKP (proof) from the output share and obtains a verification result by a verification procedure (verifying) for the restored ZKP.

<When ZKP Holder=(Data Entity Terminal 12 of) Data Entity 4>

The data entity 4 provides the verifier 8 with a proof (ZKP output share) and a signed verification logic formula, or a signed CRS if Trusted Setup is used. The verifier terminal 16 of the verifier 8 verifies the authenticity of the CRS. The verifier terminal 16 restores ZKP (proof) from the output share and obtains a verification result by a verification procedure (verifying) for the restored ZKP.

Figure 20:
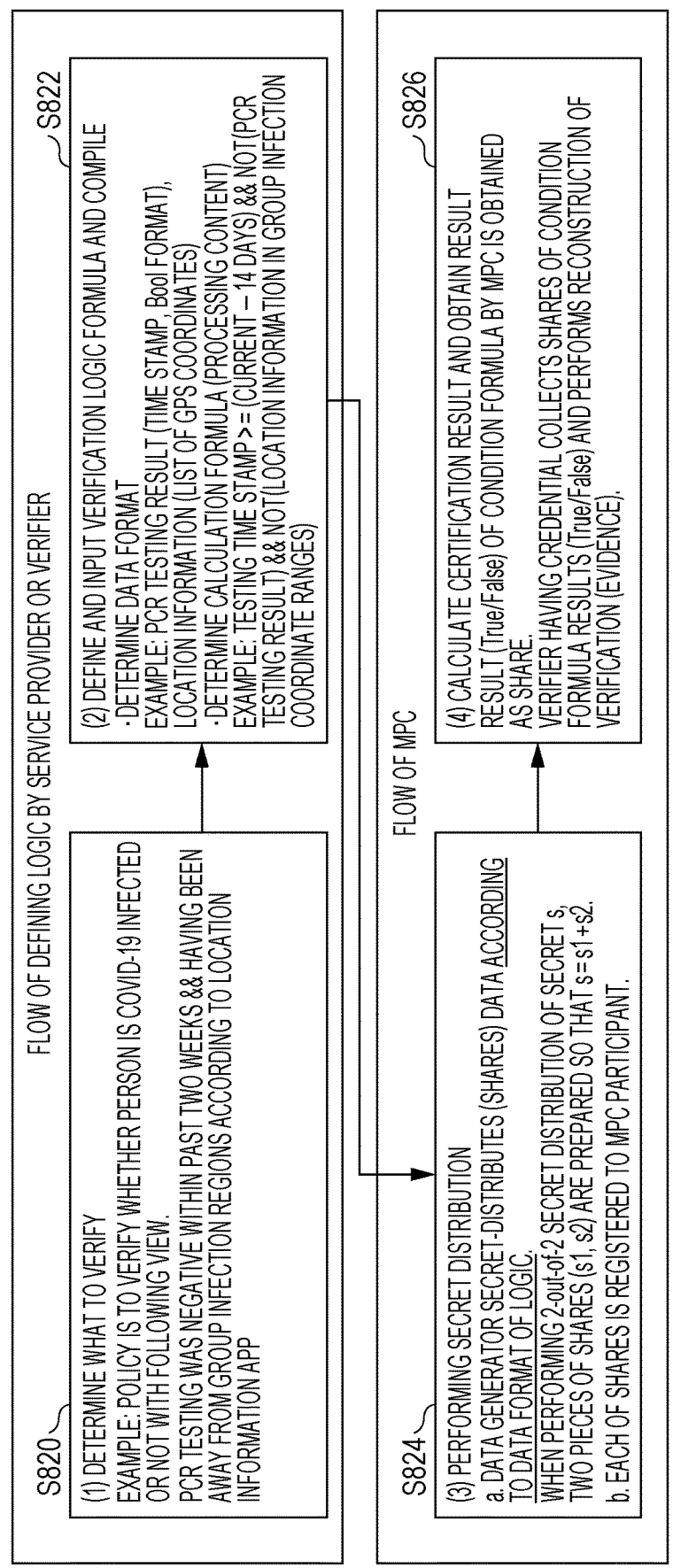
FIG. 20 is a chart illustrating a flow of a sequence of certification (evidence) by a proposition function in the MPC-ZKP system.

FIG. 20 is a chart illustrating a flow of a sequence of certification (evidence) by the proposition function in the MPC-ZKP system 2. The sequence of FIG. 20 corresponds to the proposition function evidence mode by the MPC described above. The sequence of FIG. 20 includes steps S820, S822, S824, and S826, of which steps S820 and S822 indicate the flow of the definition of the verification logic by the service provider 7 or the verifier 8, and steps S824 and S826 indicate the flow of the MPC.

In this sequence, first, contents to be certified (to be verified) are defined (step S820), and a verification logic formula thereof is generated (step S822). The verification logic may be prepared by the verifier 8 or may be prepared in advance by the service provider 7 as "well verified content". The verification logic includes a calculation formula (processing content) and a format of input data (json, yaml, toml, etc.). In the verification logic, there are for the proposition function and for the ZKP. In this sequence, it is assumed that verification logic for the proposition function is used. Upon receiving the verification logic, the management server 22 issues a verification logic ID.

In step S824, data necessary for certification is acquired.

<When Calculating by MPC and when Assuming to Provide Data to a Third-Party>

When the data necessary for verification is not registered, the data generator terminal 24 acquires the verification logic from the management server 22 of the service provider 7, and prepares a signed share of the requested data, that is, a value obtained by performing secret distribution (sharing) of the plaintext, a share of the signature to the plaintext, and a signature (signed share) to each share, according to the format of the input data. The data generator terminal 24 distributes each share one by one to the MPC participating party 9.

The MPC participating party 9 acquires the public key of the data generator 6 and verifies the completeness of the share of the signature and the signed share each received.

<When Calculating by MPC, and when not Assuming to Provide Data to a Third Party>

When the data necessary for certification is not registered, the data entity terminal 12 acquires the verification logic formula from the management server 22 of the service provider 7, and requests the data generator terminal 24 to sign the plaintext and the plaintext of the data necessary for verification, according to the format of the input data.

The data generator terminal 24 prepares a plaintext of the requested data and a signature for the plaintext. The data generator terminal 24 provides these to the data entity terminal 12.

The data entity terminal 12 verifies the completeness by the digital signature using the public key of the data generator 6.

The data entity terminal 12 secret-distributes (shares) the plaintext and the signature data for the plaintext acquired from the data generator terminal 24 to generate a signed share (for example, a share of a signed witness), and distributes each signed share one by one to the MPC participating party 9.

The MPC participating party 9 obtains the public key of the data generator 6 and verifies the completeness of the signed share (e.g., the signed witness share) each received.

In step S826, the certifier calculates the proposition function, and the verifier 8 verifies the result.

The MPC participating party 9 performs the MPC on the basis of the verification logic formula associated with the target verification logic ID, and obtains the share of the verification result. Note that the calculation of the MPC may be limited to a case where the verification logic formula satisfies the condition of the privacy policy of the individual privacy as described above. Alternatively, the management server 22 may issue a credential for authentication of share acquisition of the verification result, issue a credential ID, and then associate the credential ID.

The management server 22 notifies the data entity 4 of the information associated with the credential ID, and notifies the verifier 8 of the information when the data entity 4 desires to have the information certified, so that the certification associated with the attribute of the authentic person can be provided to the verifier 8.

In the case of using the credential, the service provider directly notifies the verifier of the information associated with the credential ID after obtaining the prior or subsequent consent of the data entity. Alternatively, the data entity 4 provides the verifier 8 with information associated with the credential ID in advance. The verifier 8 obtains a verification result (True/False) using the credential.

Figure 25:
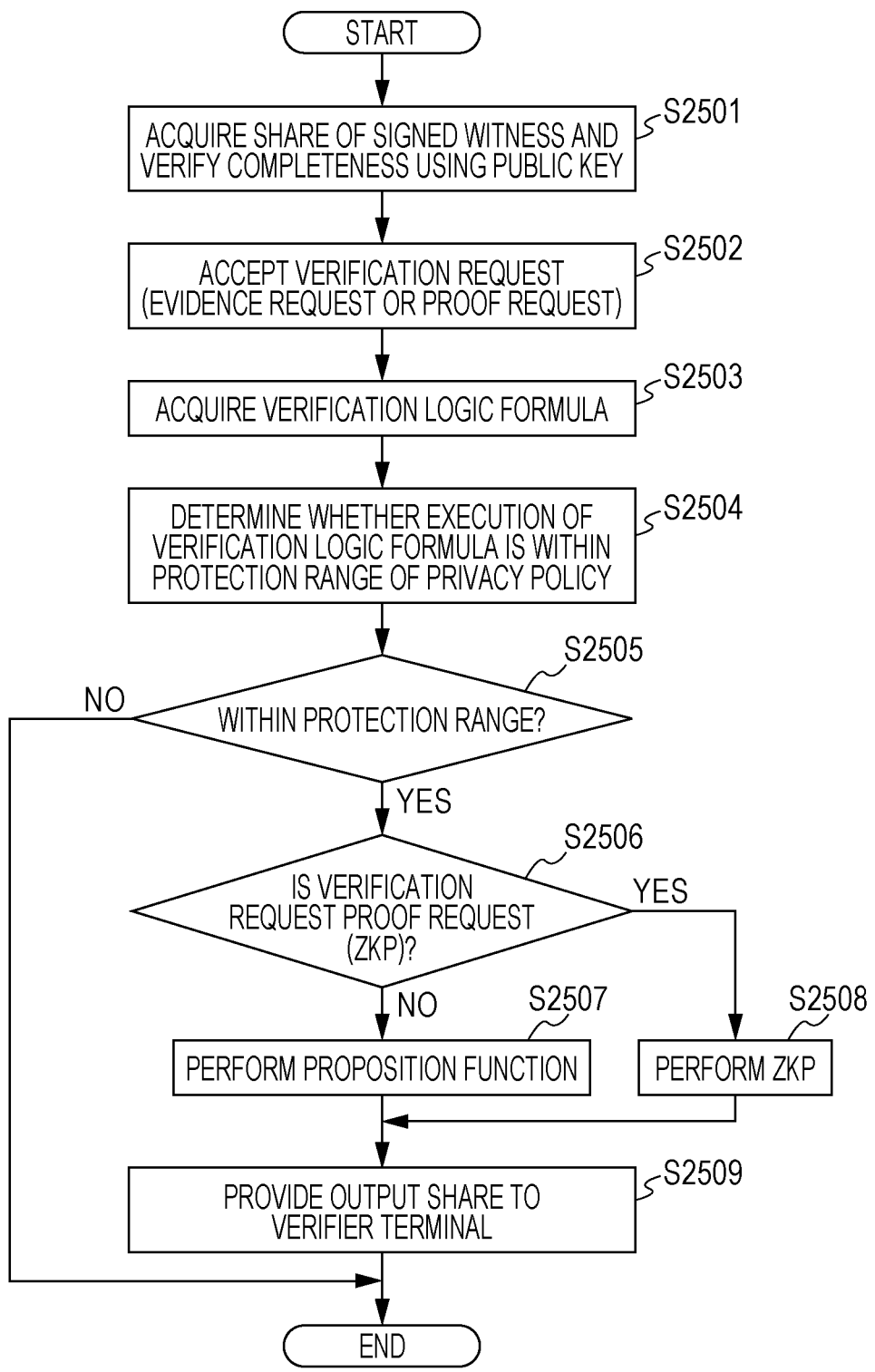
FIG. 25 is a flowchart illustrating a series of operations in the MPC participating party.

In the flowcharts illustrated in FIGS. 18 and 20, the operation in the zero-knowledge proof mode by the MPC and the operation in the proposition function evidence mode by the MPC in the entire MPC-ZKP system have been separately described. However, as described above, the zero-knowledge proof mode by the MPC is executed in the MPC participating party 9 in an appropriate combination with the proposition function evidence mode by the MPC, so that falsification by the proposition function evidence mode by the MPC can be suppressed. In addition, when the MPC participating party 9 executes the calculation of the proposition function or the ZKP, it is possible to appropriately control the privacy leak by considering the privacy policy. Hereinafter, an operation example in the MPC participating party 9 that realizes these functions will be described with reference to FIG. 25. The operation of the MPC participating party 9 is realized by the processor executing the program stored in the memory of the MPC participating party 9.

In S2501, the processor of the MPC participating party 9 acquires the share of the signed witness from the data entity terminal 12 or the data generator terminal 24, and then verifies that the acquired share of the signed witness has not been partially falsified, using the public key of the data generator terminal 24.

In S2502, the processor of the MPC participating party 9 receives a verification request which is either the evidence request or the proof request from the verifier terminal 16. At this time, the data entity ID correspondence value and the verification logic ID related to the verification request are specified. Then, in S2503, the verification logic formula is acquired (from the management server 22) on the basis of the verification logic ID.

In S2504, the processor of the MPC participating party 9 determines whether execution of the verification logic formula is within the protection range of the privacy policy. Specifically, among the data of the verification history DB and the individual policy DB described above, the comparison result associated with the data entity ID correspondence value related to the verification request and the information of the protection range of the data class are acquired, and it is determined whether the data is narrowed down to within the protection range of the data class set as the privacy policy by the execution of the current verification logic formula. In S2505, when the processor determines that the verification logic formula is within the protection range, the processor proceeds to S2506, and otherwise, the processor ends the processing.

In S2506, the processor of the MPC participating party 9 determines whether the requested verification request is a proof request (i.e. a request for execution of the ZKP). For example, the processor performs the determination of this step depending on whether the verification request received from the verifier terminal 16 is a proof request or an evidence request. The processor performs ZKP in S2508 if the verification request is a proof request, and performs a proposition function in S2507 if the verification request is an evidence request.

In S2509, the processor of the MPC participating party 9 provides the verifier terminal 16 with the output share obtained as the processing result of the proposition function or the ZKP. The verifier terminal 16 reconstructs the output share transmitted from each MPC participating party 9 and restores the result. The processor of the MPC participating party 9 ends this sequence of operations upon providing the output share to the verifier terminal 16.

In the above embodiment, examples of the storage unit are a hard disk and a semiconductor memory. In addition, it will be appreciated by those skilled in the art referred to herein, on the basis of the description in this specification, each unit is implemented by a CPU (not shown), a module of an installed application program, a module of a system program, and a semiconductor memory for temporarily storing the contents of data read from a hard disk.

According to the MPC-ZKP system 2 of the present embodiment, it is possible to realize the entrusted attribute certifier with privacy protection by using the MPC and the ZKP in combination. In particular, even when the data entity himself/herself is absent, the certification based on the raw data (privacy information) of the data entity can be executed without revealing the raw data.

The certification calculated on the user's own terminal may not be persuasive enough. In such a case, according to the MPC-ZKP system 2 according to the present embodiment, since the MPC-ZKP system 2 verifies and then certifies the authenticity of the data with the public key of the data generator (examples: hospitals, government offices, etc.), the certification is relevant to an evidence by a third party and thus the persuasiveness is enhanced.

In the MPC-ZKP system 2 according to the present embodiment, the data generator 6 creates data and adds a digital signature to the data. There may be a plurality of data generators 6. For example, it will consider a case where (1) the hospital that has performed the PCR testing and (2) the service provider of the location information service are both the data generator 6. Since both the testing result and the position information (whether or not the person has been away from group infection places) are verified by ZKP and it is found that both results are False (Negative and Has been away from group infection places), the management office of the national border, prefectural border, or the like firstly recognizes that "This person is allowed to enter the country". In the MPC-ZKP system 2, the data generator 6 himself/herself that created each piece of information (data) individually signs the information having different properties (testing result and position information), so that the reliability of the certification by the MPC-ZKP system 2 can be enhanced.

As described above, there may be two types of evidence methods.

1. Providing Only Result of Proposition Function by MPC (ZKP is Not Created)

For an execution request of a function (proposition function) that returns a true/false value, True or False is returned. Only functions permitted to be executed by the data entity are executable. In this case, there is no proof of the correct calculation process, and thus the reason is not persuasive. In a case where there is a concern about the magnitude of the calculation cost for performing the ZKP by the MPC and the shortage of the communication band and the recording area, it is suitable to preliminarily examine only True/False by the proposition function by the MPC. In a case where this result is suspicious or in a case where ZKP is requested in a surprise (random) manner, it is difficult for a certifier (service provider, MPC calculator) to easily falsify a conclusion for a request for a proposition function in view of a possibility that a contradiction occurs between the proposition function and the ZKP.

2. Providing ZKP Calculated by MPC

The validity of the calculation process until the conclusion is drawn is included in the certification content, and thus the reason is persuasive. This serves as a deterrent to the occurrence of fabrication in the evidence of the proposition functions listed above 1. In addition, various conditions such as success or failure of authentication of the signature can be assigned to the certification content of the ZKP.

The configuration and operation of the MPC-ZKP system 2 according to the embodiment have been described above. The present embodiment is an exemplification, and it is understood by those skilled in the art that various modifications can be made to the combination of each component and each processing, and such modifications are also within the scope of the present invention.

In the embodiment, the case where the data entity 4 and the data generator 6 are different has been described, but the present invention is not limited thereto. For example, the function of the data generator terminal 24 may be realized by an application operating in a trusted execution environment (TEE) of the data entity terminal 12.

In a case where the function of the data generator terminal 24 is realized by an application that operates locally in the data entity terminal 12, in a normal application, the data entity 4 can easily falsify the data. Therefore, here, an application running on the TEE is used.

A normal application may access a program or data by an operating system (OS). In this case, there is a possibility that falsification of programs and data is easily made. On the other hand, it is very difficult to falsify programs and data of applications operating in the TEE. The reason for the difficulty is that the TEE is in an environment isolated from the OS in terms of hardware, and falsification of programs and data is hardly made in an application operating in the TEE. In other words, completeness of the code and the data is protected. As long as the data entity terminal 12 is a local terminal, the protection is not perfect, but the system is secure unless a side channel is attacked.

An application running on the TEE acquires information of an external device (peripheral) operable from the TEE, that is, a sensor (GPS receiver, thermometer, etc.) connected by a wireless interface, and then arranges, analyzes, and interprets the information.

The application on the TEE shares and signs the acquisition/calculation result, and distributes the result to the MPC participating party 9. Immediately before the share distribution, the application may confirm "Do you want to distribute?" with a privacy policy attached to the user. In this manner, the "data generator 6" can be replaced with the "application on the data entity terminal 12".

What is claimed is:

1. An apparatus in a plurality of apparatuses participating in multi-party computation, the apparatus implementing a protocol to perform zero-knowledge proof in secret-distribution-based multi-party computation, the apparatus comprising:
   one or more processors; and
      a memory storing instructions which, when the instructions are executed by the one or more processors, cause the apparatus to:
   acquire a share of data related to a matter to be certified, wherein the share is a piece of the data related to the matter to be certified distributed using a secret distribution method;
   output an output share ($\tau i$) of evidence ($\tau$) obtained as a result of performing calculation of proposition function by the multi-party computation using the acquired share as an input so that reconstruction is performed to obtain the evidence
   ($\tau$) using the output shares of the evidence collected from the plurality of apparatuses participating in the multi-party computation; and
   output an output share ($\pi i$) of a proof ($\pi$) obtained as a result of performing calculation according to the protocol using the acquired share as an input in a case where a proof by the zero-knowledge proof is requested from a verifier terminal in addition to the output share of the evidence ($\pi$),
   wherein verification in the zero-knowledge proof is performed by performing reconstruction to obtain the proof ($\pi$) using the output shares of the proof collected from the plurality of apparatuses participating in the multi-party computation,
   wherein the instructions further causes the one or more processors to verify original data of the share has not been falsified, using a digital signature associated with the acquired share.

2. The apparatus according to claim 1, wherein the zero-knowledge proof is of a type using a verification logic formula or a common reference string (CRS).

3. The apparatus according to claim 2, wherein the CRS when using Trusted Setup is generated in cooperation of the plurality of apparatuses participating in the multi-party computation or verifier terminals.

4. The apparatus according to any one of claims 1 to 3, wherein the verification in the zero-knowledge proof is performed in response to a random or arbitrary request by a verifier.

* * * * *